Jan. 26, 1960 S. F. DUNNING 2,922,847

DISTRIBUTING SYSTEM

Filed Nov. 6, 1958 11 Sheets-Sheet 1

INVENTOR
S. F. DUNNING
BY Harold C. Herman
ATTORNEY

Jan. 26, 1960 S. F. DUNNING 2,922,847

DISTRIBUTING SYSTEM

Filed Nov. 6, 1958 11 Sheets-Sheet 2

INVENTOR
S. F. DUNNING
BY Harold C. Herman
ATTORNEY

INVENTOR
S. F. DUNNING
BY Harold C. Herman
ATTORNEY

INVENTOR
S. F. DUNNING
BY
Harold C. Herman
ATTORNEY

Jan. 26, 1960 S. F. DUNNING 2,922,847

DISTRIBUTING SYSTEM

Filed Nov. 6, 1958 11 Sheets-Sheet 5

INVENTOR
S. F. DUNNING
BY Harold C. Herman
ATTORNEY

INVENTOR
S. F. DUNNING
BY Harold C. Herman
ATTORNEY

Jan. 26, 1960 S. F. DUNNING 2,922,847

DISTRIBUTING SYSTEM

Filed Nov. 6, 1958 11 Sheets-Sheet 7

INVENTOR
S. F. DUNNING
BY Harold C. Herman
ATTORNEY

INVENTOR
S. F. DUNNING
BY Harold C. Herman
ATTORNEY

DISTRIBUTING SYSTEM

Filed Nov. 6, 1958 11 Sheets-Sheet 9

INVENTOR
S. F. DUNNING
BY Harold C. Herman
ATTORNEY

Jan. 26, 1960 S. F. DUNNING 2,922,847

DISTRIBUTING SYSTEM

Filed Nov. 6, 1958 11 Sheets-Sheet 10

INVENTOR
S. F. DUNNING
BY Harold C. Herman
ATTORNEY

INVENTOR
S. F. DUNNING
BY Harold C. Herman
ATTORNEY

United States Patent Office 2,922,847

Patented Jan. 26, 1960

2,922,847

DISTRIBUTING SYSTEM

Sanford F. Dunning, Wheaton, Ill., assignor to American Telephone and Telegraph Company, a corporation of New York Application November 6, 1958, Serial No. 772,239

12 Claims. (Cl. 179—27)

This invention relates to telephone systems and more particularly to call distributor systems for automatically distributing calls to idle operator positions.

A distributing system includes a number of call distributors which are utilized for frequently called subscribers such as department stores, airline and railroad terminals, telegram operators, and the like. The central office serving the frequently called number is connected to the distributor, which is at the subscriber's location, by a number of trunks. The application of ringing tone in the central office to any one of the trunks initiates the operation of the distributor to connect the rung trunk to an idle operator position for serving the call.

An object of this invention is to provide an improved highly flexible automatic distributor for serving calls to a relatively small group of operator positions.

Another object of this invention is to provide a distributing system having a number of distributors among which calls can be readily transferred.

Still another object of this invention is to provide facilities for establishing conference connections through one or more distributors in a telephone system.

In accordance with the present invention the trunks are connected by crossbar switches to the operator positions. Each select magnet of the switches is individual to a pair of trunks and each hold magnet is individual to an operator position.

A feature of the present invention relates to the provision of means for transferring calls from each of the operator positions to other operator positions, to a supervisory position, to operator positions of other distributors, and to the P.B.X operator. Each of the operator positions includes a number of control keys each of which initiates a predetermined transfer operation.

Another feature of this invention relates to means for establishing multiple connections through the crossbar switches under control of the transfer equipment so that conference calls with any number of operators in a number of distributors may be established. The multiple connection establishing means includes equipment for reoperating the select magnet associated with the rung trunk and then operating a hold magnet corresponding to the transfer destination. The hold magnet corresponding to the operator position controlling the transfer remains operated so that parallel connections are established through the crossbar switches. A transfer through the crossbar switches to an operator position in another distributor is particularly useful because it greatly extends the possible service to the calling party. By transferring the call to another distributor the call is effectively transferred to a different subscriber number. For example, a call made to a railroad reservation desk may be transferred to the reservation desk of an airline, busline or another railroad or to a department of the same railroad at another location which has a different telephone number. The high degree of flexibility in the type of transfer with a number of possible simultaneous connections available through the crossbar switch is an important feature of this invention.

The distributor of the present invention is flexible in another manner in that the number of crossbar switches may be varied. The connecting equipment, which has heretofore been relatively inflexible in size, forms a major part of a distributor. A further feature of this invention pertains to the provision of means for readily changing the size of the connecting equipment in a distributor. If a subscriber finds that twenty operator positions are required instead of ten, the distributor is readily enlarged by adding a crossbar switch and the ten additional operator positions.

Still another feature of this invention relates to the provision of means for equitably distributing the calls to the operator positions. In particular, the last two positions in a selection chain of operator positions receive calls on an equitable basis with the rest of the positions. In a small distributor an inequitable distribution is readily detected. The operator positions are selected under control of a position gate which is disabled if no calls are awaiting service. When ringing tone is applied to one of the trunks a trunk gate and the position gate are successively closed. When the position gate closes all idle positions are included in the preference chain including the last two positions in the chain.

A further feature of this invention relates to the provision of means for flashing a P.B.X operator under control of any one of the operator positions. At the operator position a transfer is initiated to connect a flashing circuit through the crossbar switches in the distributor to the trunk from the P.B.X operator position. The operator position is returned to normal after flashing is initiated to be able to serve another call without disturbing the flashing connection.

Further objects and features will become apparent upon consideration of the following description when read with reference to the drawing wherein:

Figs. 1 through 10, when arranged in accordance with Fig. 11, are a circuit representation of the distributor system of this invention wherein Fig. 1 illustrates a trunk circuit of a first distributor in the distributor system;

*General description*

Figure 1:
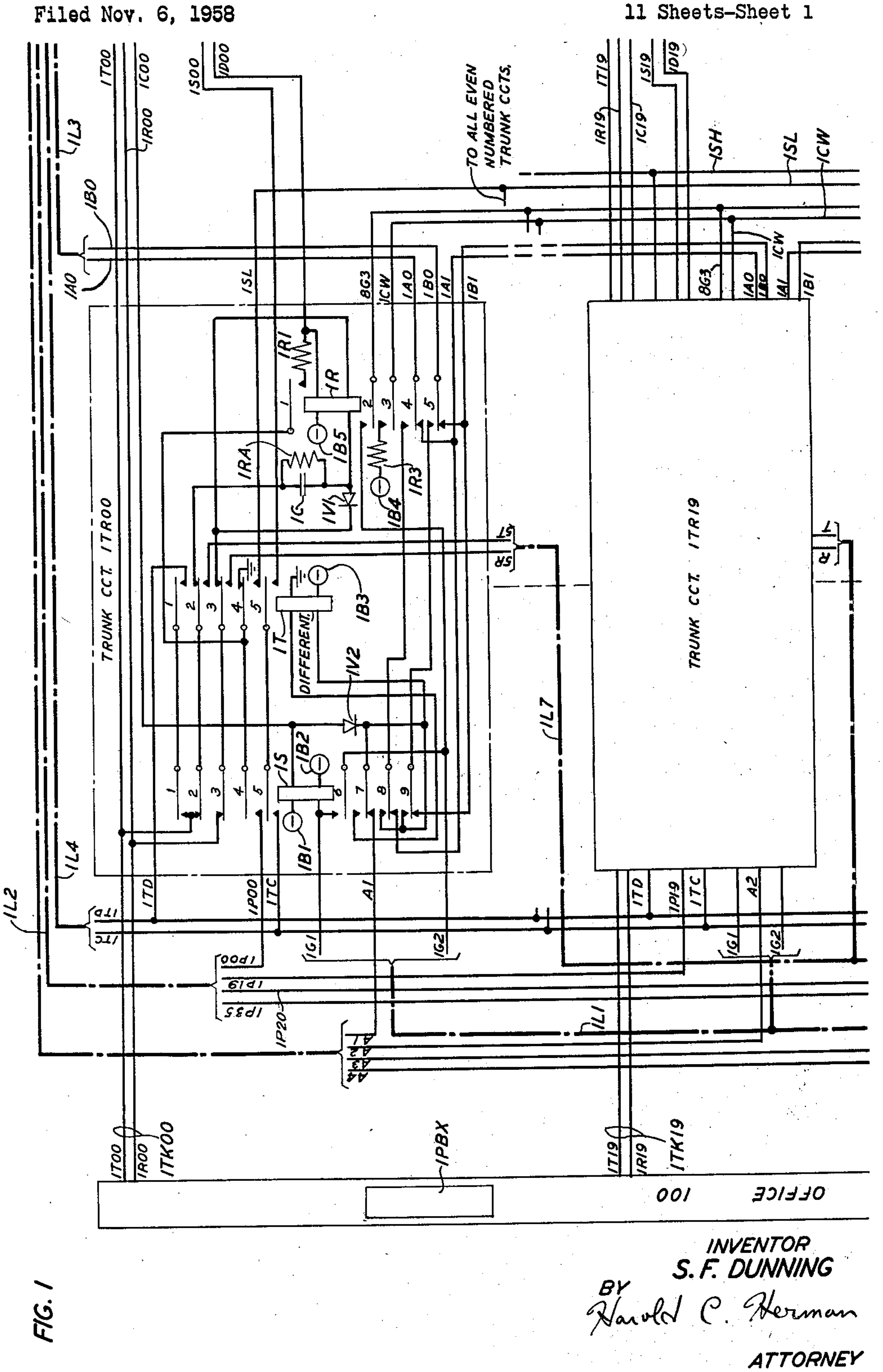
Figures 11, 12:
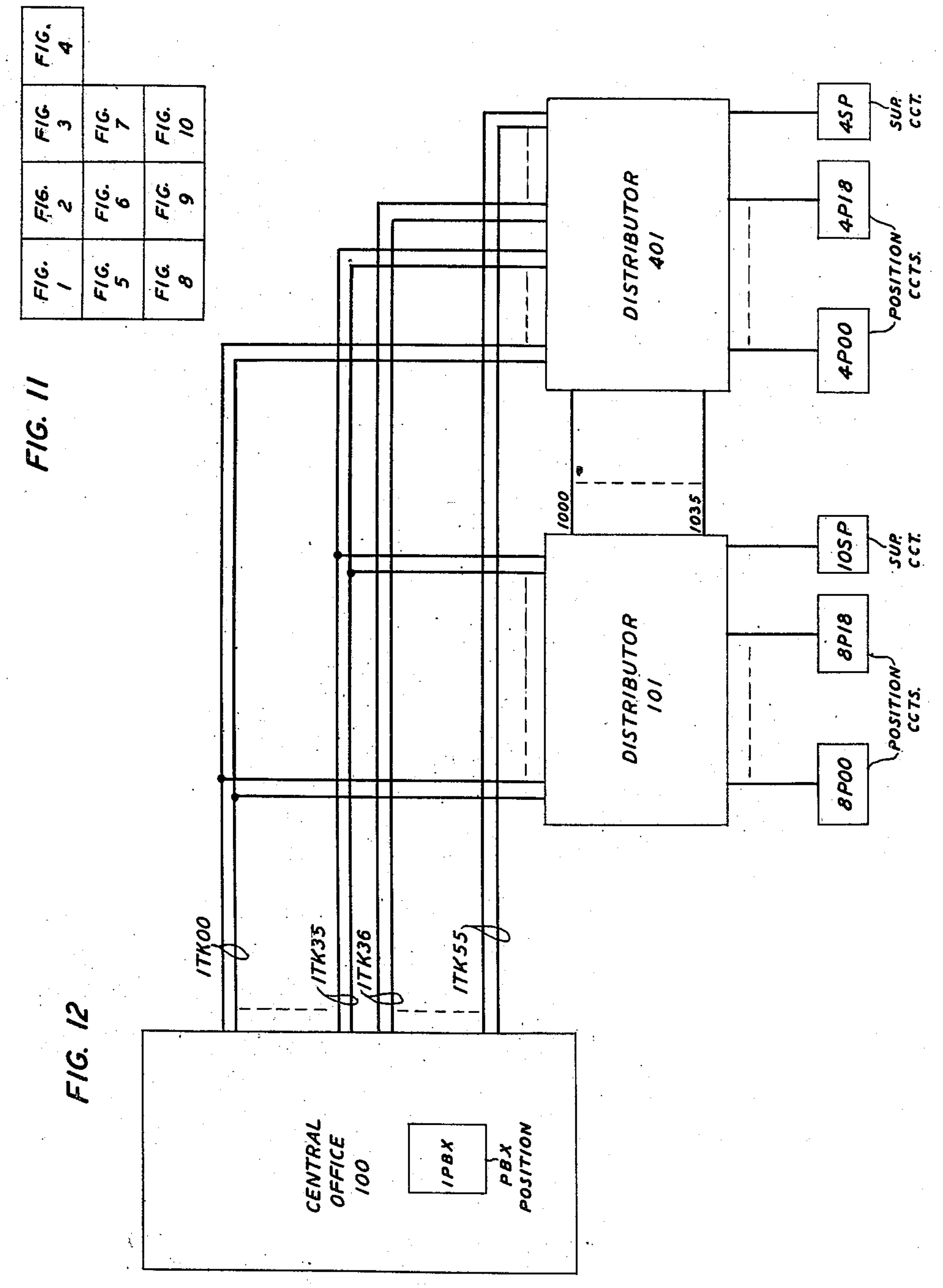
Fig. 11 illustrates the arrangement of Figs. 1 through 10.
Fig. 12 illustrates functionally the distributor system of this invention.

Before proceeding with the detailed description of the distributor system of this invention, some of the main functions of the distributing system are described with reference to the functional representation of the system as shown in Fig. 12. Referring to Fig. 12, the designations of the various functional units shown therein include an indication of the figure in the detailed circuit drawing in which the unit appears and generally also an indication of the function of the unit. For example, the first digit 1 of the designation 1TK00 in Fig. 12 indicates that it also appears in Fig. 1 of the detailed circuit representation and the letters TK indicate that the designation is of a trunk.

The trunk 1TK00 is one of 56 trunks, 1TK00–55, which extend from a central office 100 to two distributors 101 and 401. The central office 100 includes all the equipment necessary for applying ringing tone to any one of the trunks 1TK00–55 including switching equipment, ringing supplies, P.B.X stations, etc. The distributors 101 and 401 are located at two different subscriber locations, as, for example, at two railroad reservation terminals. The 36 trunks 1TK00–35 are multipled to both distributors 101 and 401 and the twenty trunks 1TK36–55 are connected only to the distributor 401. The distributors 101 and 401 operate, respectively, when the two subscriber numbers assigned to the two railroad reservation terminals are called. Ringing tone is applied to one of the 36 trunks 1TK00–35 when one number is called and to one of the trunks 1TK36–55 when the other number is called. When ringing tone is applied to one of the trunks 1TK00–35, the distributor 101 functions to connect it to an idle one of nineteen order position circuits 8P00–18 associated therewith, and when ringing tone is applied to one of the trunks 1TK36–55, the distributor 401 functions to connect it to one of the nineteen order position circuits 4P00–18 associated therewith. Actually only eighteen of the position circuits 8P00–18 can be utilized for serving a call because, as is hereinafter described, the position circuit 8P09 is utilized for signaling or flashing a P.B.X operator.

After a connection has been established from one of the trunks 1TK00–35 to one of the position circuits 8P00–08 and 8P10–18, the connection can be transferred by the operator serving the call through the distributor 401 to an idle one of the order positions 4P00–18. Assume, for example, the ringing tone is applied to the trunk 1TK00 and responsive thereto, a connection is established by the distribtuor 101 from the trunk 1TK00 to the position circuit 8P00. Thereafter after conversation with the calling subscriber, the operator at the position circuit 8P00 can transfer the connection from the trunk 1TK00 through the distributor 401 to an idle one of the position circuits 4P00–18. The operator at the position circuit 8P00 can also transfer the call to other position circuits at the distributor 101, to a supervisor at the distributor 101, and to a P.B.X. operator in the central office 100. All transfer operations from the circuit 8P00 utilize an additional connection through the distributor 101. The position circuit 8P09, which is not shown specifically in Fig. 12, is utilized for flashing the P.B.X operator at the position 1PBX. The operator at circuit 8P00 initiates a transfer operation to the position circuit 8P09 which flashes the P.B.X. operator at the position 1PBX through trunk 1TK00. The operator at the circuit 8P00 can release as soon as flashing is initiated to service another call.

The connection through the distributor 101 to the circuit 8P00 is released when the operator at the position circuit 8P00 disconnects.

A large number of connections may be multiplied through the distributor 101 for conference calls by successively initiating transfers. The system is in this manner highly flexible providing for both diversified transfers and multiple connections.

*Detailed description*

Figure 4:
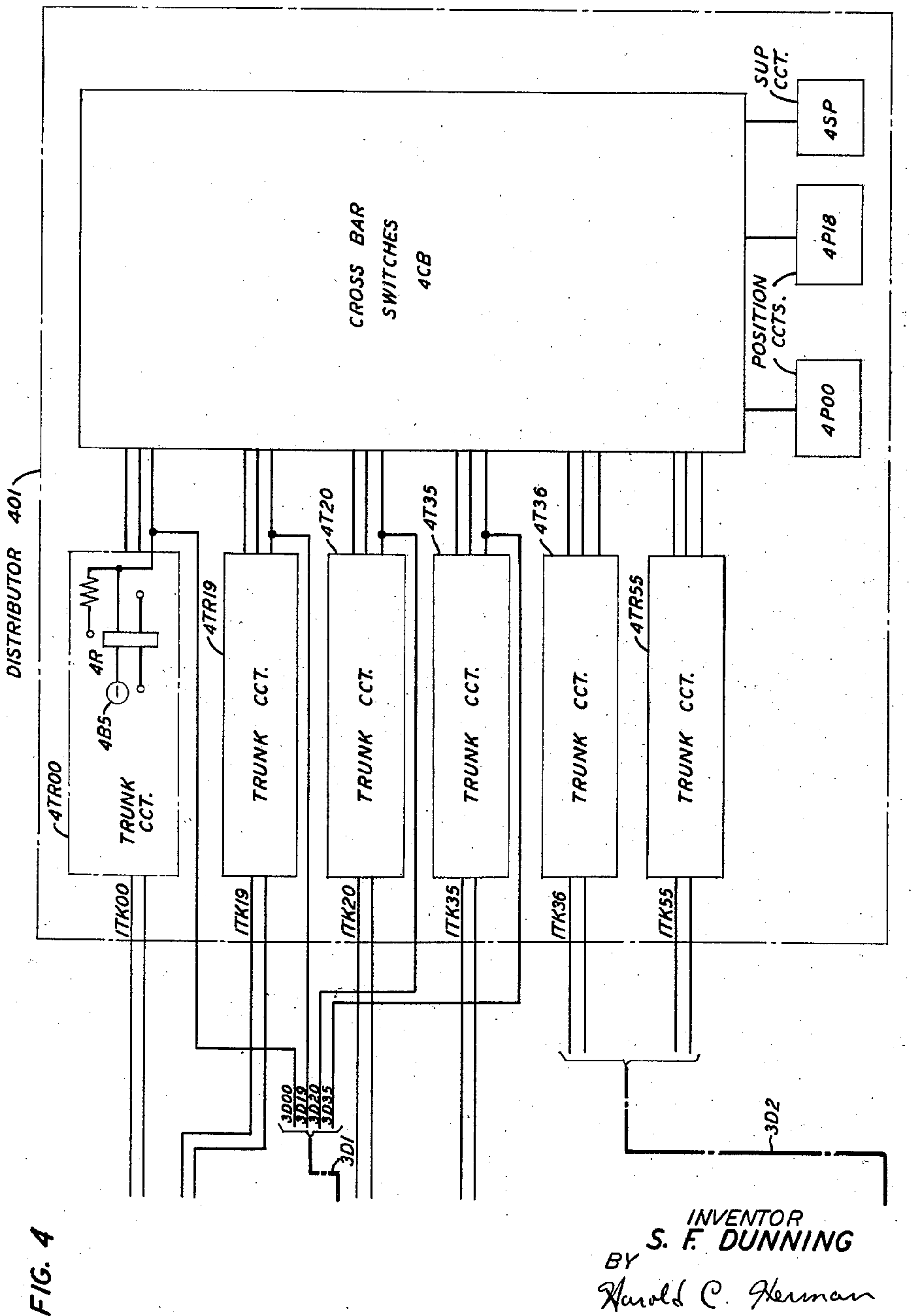
Fig. 4 illustrates functionally a second distributor in the distributor system.
Figure 5:
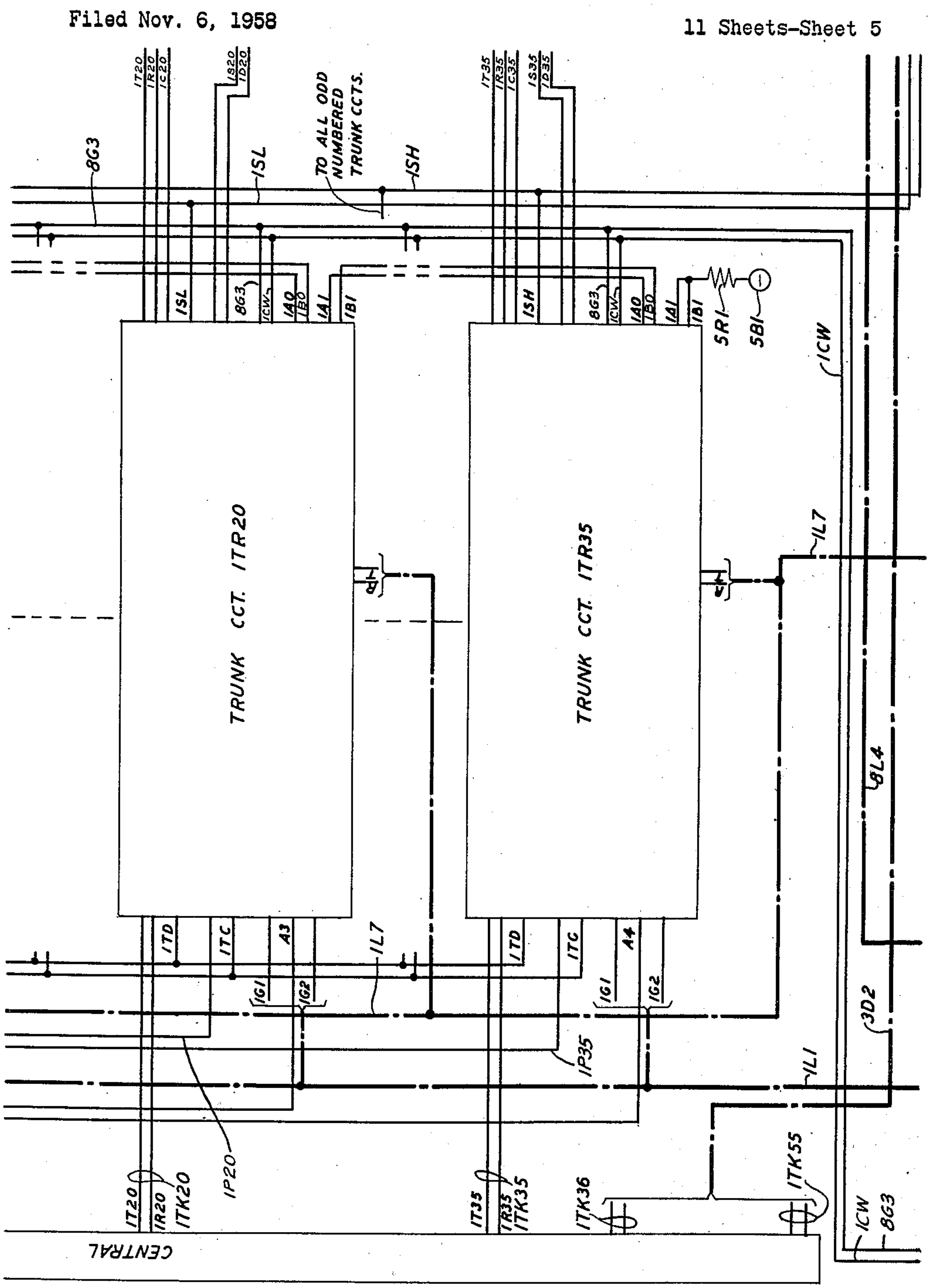
Fig. 5 illustrates functionally additional trunk circuits in the first distributor.
Figure 6:
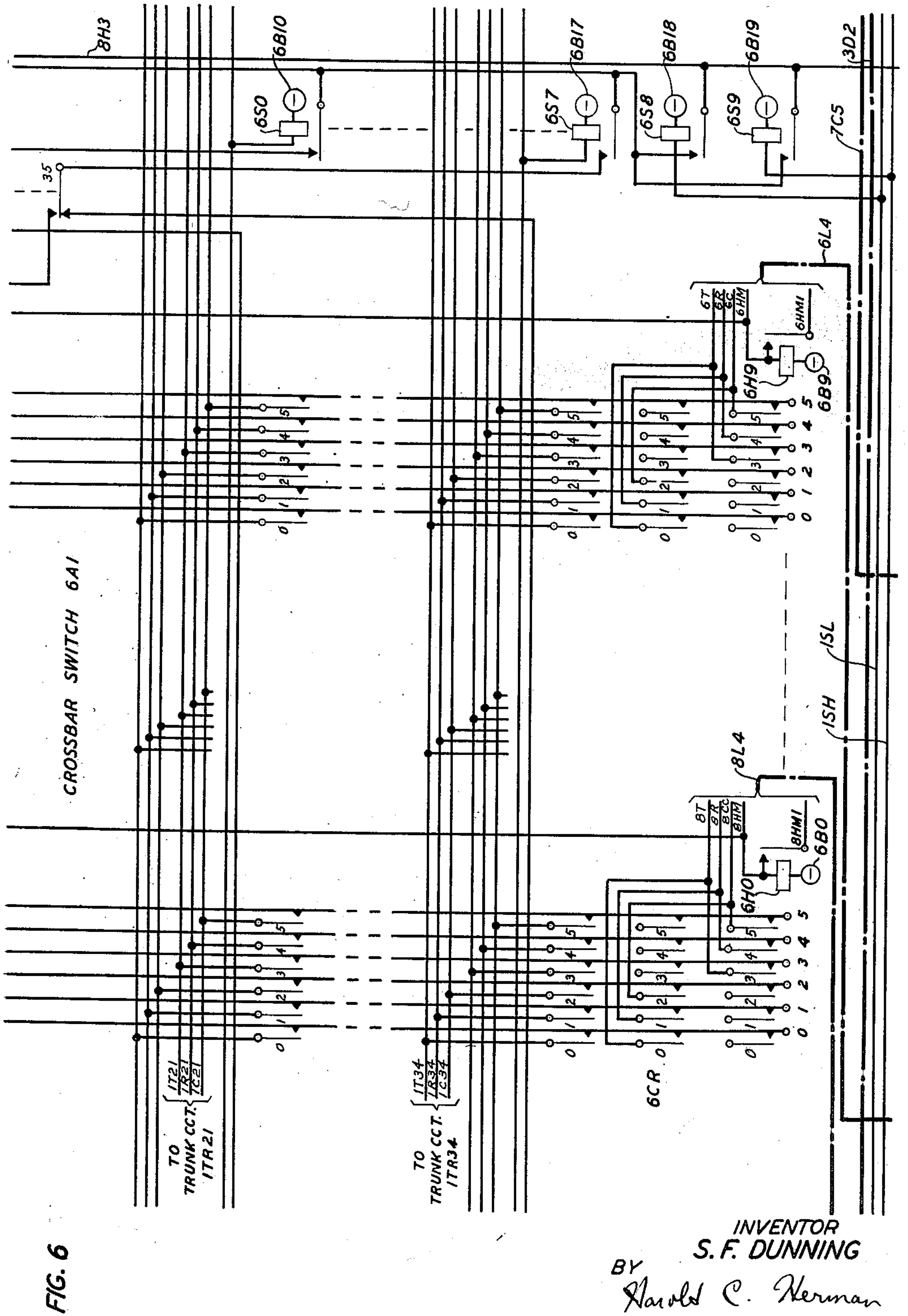
Figure 7:
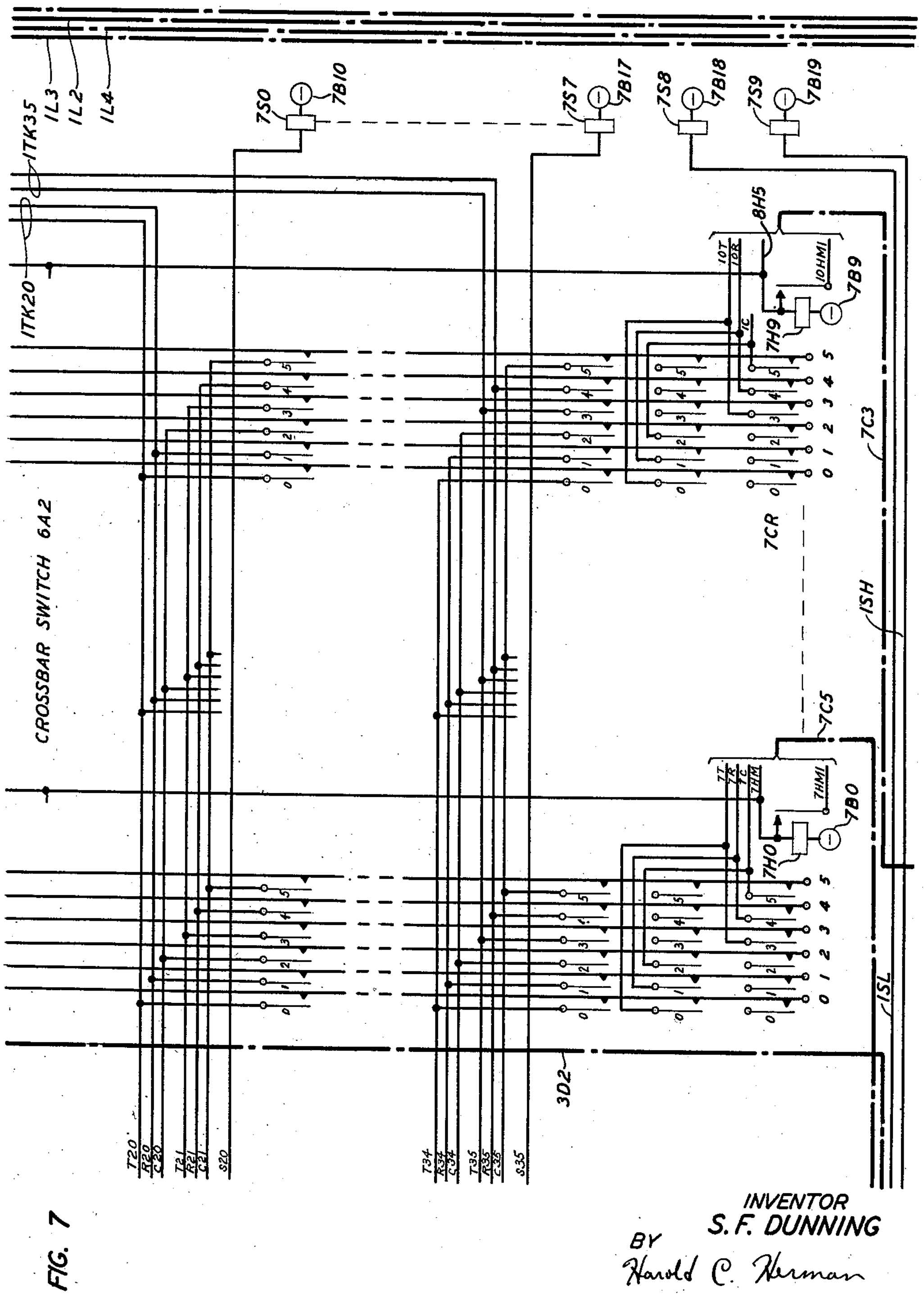

Referring now to the detailed circuit representation shown in Figs. 1 to 10, as arranged in accordance with Fig. 11, the distributor 101 is shown in Figs. 1 to 3 and 5 to 10 and distributor 401 is shown in Fig. 4. The sequence of operations for extending a connection is initiated when ringing current is applied across the tip and ring leads of one of the trunks 1TK00–55 by the central office 100. Assume, for example, that the call is directed to the railroad terminal associated with the distributor 101 and that trunk 1TK00 is utilized for the call. The central office 100 includes all the equipment necessary, including switching equipment, P.B.X equipment, ringing supply, etc., for extending a connection to the trunks 1TK00–55 and for applying ringing tone thereto. At the same time that ringing current is applied to the trunk 1TK00 by the central office 100, a ground potential is also applied from the central office 100 to the tip lead 1T00 to the trunk 1TK00. As is hereinafter described, the ground potential on the tip lead 1T00 is utilized during the connecting sequence.

A signal may also be applied to the trunks from a P.B.X position 1PBX to initiate the operation of the distributors 101 and 401. If the call is from the P.B.X position 1PBX, a positive potential is supplied on the ring lead of the trunk, as well as the ground potential on the tip lead. Ringing tone is not applied to the trunks for calls through the P.B.X position 1PBX.

The ringing tone or signal applied to the trunk 1TR00 operates a ring relay 1R in a trunk circuit 1TR00. The trunk circuit 1TR00 is one of 36 trunk circuits 1TR00–35 in the distributor 101 which are respectively connected to the trunks 1TK00–35. In addition to the 36 trunk circuits 1TR00–35 in the distributor 101 which are connected to the trunks 1TK00–35, the distributor 401 includes 36 trunk circuits 4TR00–35 which are also connected to the trunks 1TK00–35. As is hereinafter described, the connections in the trunk circuits 4TR00–35 differ from those in the trunk circuits 1TR00–35 such that only the associated one of the circuits 1TR00–35 operates responsive to the signal on one of the trunks 1TK00–35. The relay 4R in the trunk circuit 4TR00 is not connected to the trunk 1TK00 and, accordingly, does not operate responsive to the signal applied to the trunk 1TK00.

The operating path for the relay 1R in the trunk circuit 1TR00 is from the tip lead 1T00 of the trunk 1TK00 through the normal armature 2 of a seizure relay 1S, the normal armature 2 of a differential relay 1T, a capacitor 1C shunted by the resistor 1RA, through the lower winding of the relay 1R, the normal armature 3 of the relay 1T and the normal armature 3 of the relay 1S to the ring lead 1R00 of trunk 1TK00. When relay 1R operates, it closes a primary locking path through its upper winding, and it in turn operates the seizure releay 1S and a gate control relay 8GC1. The locking path is from battery 1B5 through the upper winding of relay 1R, resisor 1R1, the operated armature 1 of relay 1R, the normal armature 4 of relay 1T to ground potential. As is hereinafter described, when relay 1S operates, it extends the path from battery 1B5 through its armature 4 to a source of ground potential. The windings of the relays 8GC1 and 1S are serially connected over a path from ground at the winding of the relay 8GC1 through a lead 8G3, the now operated armature 2 of relay 1R, a lead 1G2 which is part of cable 1L1, a normal armature 00 of a trunk gate relay 8GT, a lead 1G1 which is also a part of cable 1L1, and the lower winding of the relay 1S to the negative battery 1B2. Relay 1S in the trunk circuit 1TR00 and the gate control relay 8GC1 are in this manner serially operated by the relay 1R. Relay 1S is operated only if the gate relay 8GT is normal at the time that relay 1R operates. If relay 8GT is operated when relay 1R operates, it indicates that other calls are being served by the distributor 101 and the call on trunk 1TK00 awaits service until relay 8GT releases.

When relay 1R operates, it also connects a battery 1B4 through resistor 1R3, the now operated armature 3 of relay 1R and lead 1CW to the traffic indicator meter 8MT. As long as relay 1R is operated, it provides current from battery 1B4 to the meter 8MT. As relays 1R in the other circuits 1TR01–35 operate, additional current is provided therefrom in parallel to the meter 8MT. As is hereinafter described, relay 1R is released as soon as the associated trunk is connected to one of the position circuits 8P00–08 and 8P10–18. The meter 8MK receives therefor an indication through lead 1CW of the number of calls awaiting service.

Assuming that the gate relay 8GT is normal, relay 1S in the trunk circuit 1TR00 and the relay 8GC1 are operated when relay 1R of the circuit 1TR00 operates. When relay 1S in the circuit 1TR00 operates, it completes an auxiliary locking path for the relay 1R, it locks itself operated and it operates the differential relay 1T which is also in the circuit 1TR00. The auxiliary locking path for the relay 1R is from battery 1B5 through the upper winding of relay 1R, resistor 1R1, the operated armature 1 of relay 1R, the operated armature 4 of relay 1S, lead 1P00 which is part of cable 1L2 and the normal armature 00 of relay 10TR to ground.

The locking path for relay 1S is from battery 1B2 through the lower winding of relay 1S, the now operated armature 6 of relay 1S, the operated armature 2 of relay 1R and lead 8G3 to the grounded winding of relay 8GC1. In this manner when relay 1S operates, it locks to ground through a path which shunts the portion of its operating path through armature 00 of the gate relay 8GT. When, as is hereinafter described, the gate relay 8GT is operated, it prevents the admittance of subsequent calls by opening the operating paths for all 36 relays 1S.

As indicated above, relay 1R also operates the gate control relay 8GC1 over the same path, described above, as for relay 1S. When the relay 8GC1 operates, it connects ground through its now operated armature 1, a thermistor 8L1 and the winding of the relay 8GT to the battery 8B1 causing relay 8GT to operate. The thermistor 8L1 effectively delays the operation of the relay 8GT by holding the current below its operating value for an interval after circuit closure. As indicated above, when the relay 8GT operates, it opens the operating paths for all the relays 1S in the trunk circuits 1TR00–35 so that the relays 1S in the trunks 1TR01–35 cannot operate. The relay 1S in the trunk circuit 1TR00, however, remains locked operated over its locking path which shunts the armature 00 of relay 8GT. Relays 8GT and 8GC1 form a gate circuit which controls the manner in which the calls arriving on trunks 1TR00–35 are served. The relay 8GC1 remains operated as long as any one of the 36 relays 1R, which is associated with an operated relay 1S, remains operated. As indicated above and as is hereinafter described, a relay 1R is released after the trunk corresponding thereto has been connected to an order position. In this manner and as further described, the relays 8GC1 and 8GT control the admittance of calls to the distributing system.

As also indicated above, when the relay 1S in the trunk circuit 1TR00 operates, it in turn operates the differential relay 1T in the trunk circuit 1TR00. Only one of the 36 relays 1T operates because the relay windings of the 36 relays 1T are connected in a preference chain and only one for the entire distributor 101 can operate at a time.

The relays 1T in the trunk circuits 1TR00–35 are connected so that the relay 1T in the lowest designated one of the circuits 1TR00–35 operates. In this manner the relay 1T in the circuit 1TR00 operates independent of whether a relay 1S in any of the circuits 1TR01–35 is operated. The operating path for relay 1T is from battery 1B3 through the lower winding of relay 1T, the operated armatures 8 and 9 in parallel of the relay 1S, the operated armatures 4 and 5 in parallel of the relay 1R, leads 1A0 and 1B0 in parallel through cable 1L3, the two windings in parallel of a differential relay 10T in a transfer circuit 10TS, the normal armature 2 of a connect relay 10C also in the transfer circuit 10TS, a normal armature 5 of a slow release relay 10SR in a trunk release circuit 10TRC, a normal armature 1 of the differential relay 10L in a control circuit 10CON and the normal armature 1 of a relay 10R1 also in the circuit 10CON to ground. In order for relay 1T in the trunk circuit 1TR00 to operate therefor, both relays 1R and 1S also in the circuit 1TR00 must be operated.

If relay 1R in the circuit 1TR00 is normal when a relay 1R in one of the other circuits 1TR00–35 is operated, the ground connection through leads 1A0 and 1B0 of cable 1L3 is connected through the normal armatures 4 and 5 of relay 1R to leads 1A1 and 1B1 which are connected to leads 1A0 and 1B0, respectively, of the trunk circuit 1TR01. In this manner, if relay 1R of any one of the circuits 1TR00–34 is normal, it provides for a chain connection through its normal armatures 4 and 5 to its next adjacent one of the circuits 1TR01–35. The leads 1A1 and 1B1 of the last trunk circuit 1TR35 in the chain are multipled through a resistor 5R1 to the negative battery 5B1. If all 36 relays 1R are normal, battery 5B1 is connected through cable 1L3 to the windings of the relay 10T in the transfer circuit 10TS. The relay 10T does not operate as long as the same potential is provided across both of its windings. It, accordingly, does not operate when relay 1T in the trunk circuit 1TR00 operates. If relay 1R in the trunk circuit 1TR00 is operated but relay 1S in the same trunk circuit is not operated, the associated relay 1T in the same trunk circuit cannot operate. When relay 1S is normal, a shunting path is provided between leads 1A0 and 1A1 of the same trunk circuit and between leads 1B0 and 1B1 also of the same trunk circuit. If relay 1S is operated, it opens the chain at its armatures 8 and 9 and extends the ground connection through cable 1L3 to the lower winding of the relay 1T associated therewith.

When relay 1T in the circuit 1TR00 operates, it readies a path for the select magnets 2S0 and 3S0 of the crossbar switches 2C1 and 2C2, respectively, it opens the primary locking path through its armature 4 for relay 1R, and it operates the select magnets 6S8 and 7S8 of the crossbar switches 6A1 and 6A2 and the relay 10TC in the discriminator 10DIS. The distributor 101 includes the four crossbar switches 2C1–2 and 6A1–2 for extending connections from the trunks 1TR00–36 to nineteen order position circuits 8P00–18 and to a supervisory circuit 10SP. Each of the crossbar switches 2C1–2 and 6A1–2 is a 10 by 10 crossbar switch having ten horizontals and ten verticals with each crosspoint having six armatures 0–5. Each of the crossbar switches 2C1–2 and 6A1–2 includes ten select magnets and ten hold magnets. The switch 2C1 includes the select magnets 2S0–9 and the hold magnets 2H0–9; the switch 2C2 includes the select magnets 3S0–9 and the hold magnets 3H0–9; the switch 6A1 includes the select magnets 6S0–9 and the hold magnets 6H0–9; and the switch 6A2 includes the select magnets 7S0–9 and the hold magnets 7H0–9. The windings of the select magnets 2S0–9 and 3S0–9 of the same level are multipled in parallel to provide for simultaneous operation. In a similar manner the windings of the select magnets 6S0–9 and 7S0–9 are multipled and paralleled; the windings of the hold magnets 2H0–9 and 6H0–9 are multipled and paralleled; and the windings of the hold magnets 3H0–9 and 7H0–9 are multipled and paralleled. The corresponding horizontal levels of the crossbar switches 2C1 and 2C2 are connected together; the corresponding horizontal levels of the crossbar switches 6A1 and 6A2 are connected together; the corresponding verticals of the switches 2C1 and 6A1 are connected together; and the corresponding verticals of the switches 2C2 and 6A2 are connected together. In this manner the four switches 2C1–2 and 6A1–2 form effectively a 20 by 20 crossbar switch with each cross-point of the switch providing for six connections. Each of the first eighteen horizontal levels of this combined switch is connected to two of the trunks 1TK00–35 and each of the last two horizontal levels of the combined switch is connected to one of the order position circuits 8P00–18 and circuit 10SP. As is hereinafter described, the last two horizontal levels of the combined switch are utilized to select one of two trunks to be extended as each horizontal serves two trunks.

As indicated above, when relay 1T in the trunk circuit 1TR00 operates, it readies a path for the select magnets 2S0 and 3S0 and it closes an operating path for the select magnets 6S8 and 7S8. The select magnets 6S8–9 and 7S8–9 in the last two horizontals identify which one of the two trunks connected to the first horizontal level is to be extended to one of the order position circuits 8P00–18. The path that is readied for the magnets 2S0 and 3S0 is from ground in the discriminator 10DIS through the windings of the relay 10TC, lead 1TC which is part of cable 1L4, the operated armature 5 of relay 1S in the circuit 1TR00, the operated armature 5 of the relay 1T in the circuit 1TR00, lead 1S00 to the windings of the select magnets 2S0 and 3S0. The windings of the select magnets 2S0 and 3S0 are connected respectively to the batteries 2B10 and 3B10. The operating path for the select magnets 2S0 and 3S0 includes both windings of the trunk connect relay 10TC. Relay 10TC operates but the impedance of its two windings inhibits the current through the path so that the magnets 2S0 and 3S0 do not operate. As is hereinafter described, when the upper winding of the relay 10TC is shunted, the select magnets 2S0 and 3S0 operate. The operating path for the select magnets 6S8 and 7S8 is from ground at the normal armature 00 of a transfer relay 10TR, lead 1P00 which is part of cable 1L2, the operated armature 4 of relay 1S, the operated armature 4 of relay 1T, lead 1SL, the windings of the select magnets 6S8 and 7S8 in parallel and connected, respectively, to the batteries 6B18 and 7B18.

When the relay 1T operates, it extends a connection from the position circuits 1P00–18 through cable 1L7 to armatures 2 and 3 of relay 1S. If for any reason relay 1S is normal during the time relay 1T is operated, trouble is indicated because relay 1T is not supposed to be operated unless its associated relay 1S is operated. If such a condition occurs ringing is tripped by the connection of the tip lead 1T00 through the normal armature 2 of relay 1S, the operated armature 2 of relay 1T, lead 5T through cable 1L7, the operated armature 2 of relay 8PA in any one of the circuits 8P00–18, back through lead 5R of cable 1L7, the operated armature 3 of relay 1T and the normal armature 3 of relay 1S to the ring lead 1R00. As is hereinafter described, the relays 8PA are operated to indicate an idle position.

If trouble conditions are not present to trip ringing the call is served with relay 10TC operating. When the relay 10TC operates, it in turn operates the associated relay 10TC1 over a path from ground through the operated armature of relay 10TC and the winding of relay 10TC1 to the negative battery 10B4. When relay 10TC1 operates, it shunts the upper winding of relay 10TC by extending a connection from the junction of the two windings of relay 10TC through a diode 10D1, the operated armature 7 of the relay 10TC1 and the normal armature 1 of relay 10R1 in the control circuit 10CON to ground. The reduction in impedance due to shunting the upper winding of relay 10TC permits the select magnets 2S0 and 3S0 to operate. With the select magnets 2S0 and 3S0 operated as well as the select magnets 6S8 and 7S8, one select magnet is operated in each of the four crossbar switches 2C1–2 and 6A1–2 so that two of the twenty horizontal levels of the combined switch arrangement are readied.

When relay 10TC1 operates, it also readies a circuit for operating a trunk disconnect relay 10TD in the release circuit 10TRC as a check for an abandoned call. If the call is abandoned before relay 10TC1 operates and the ground potential provided by the central office 100 to the tip lead 1T00 of the trunk 1TKOO is removed, a connection is not established through the switches 2C1–2 and 6A1–2. The ground on the tip lead 1T00 is utilized to check for an abandoned call as a connection is extended by the relay 10TC1 from the lead 1T00 to the winding of relay 10TD. The connection from the lead 1T00 is through the operated armature 1 of relay 1S, the operated armature 1 of relay 1T, lead 1TD of cable 1L4, the operated armature 9 of relay 10TC1 and the winding of relay 10TD to battery 10B5.

If the call is abandoned so that relay 10TD does not operate, the relay 10TC1 operates a slow operate and release relay 10SR in the release circuit 10TRC to return the distributor system to normal relative to the call on trunk 1TK00. The operating path for relay 10SR is from ground through the operated armature 8 of relay 10TC1, the normal contacts of relay 10TD, the thermistor 10TH, the normal armature of relay 10RN and the winding of relay 10SR to the battery 10B6.

When relay 10SR operates, indicating an abandoned call, it in turn operates a relay 10TR, a message register relay 10MS, a lamp 10LA and a relay 10RN. Relay 10TR is operated over a path from ground through the operated armature 8 of relay 10TC1, the normal contacts of relay 10TD, the operated armatures 4 and 3 of relay 10SR and the winding of relay 10TR to battery 10B1. When relay 10TR operates, it opens at its armature 00 the auxiliary locking path for relay 1R in the trunk circuit 1TR00 and the operating path for the select magnets 6S8 and 7S8 causing them to release.

The message register relay 10MS is operated over a path from ground through the operated armature 2 of relay 10SR and the winding of relay 10MS to the battery 10B3. When relay 10MS operates, the message register adds a count of one. This register keeps a running count of the abandoned calls.

The lamp 10LA is operated over a path from ground through the operated armature 1 of relay 10SR and the lamp 10LA to battery 10B2. The lamp 10LA remains energized as long as relay 10SR is operated as an indication that a release sequence is taking place. With the locking path for relay 1R opened, relay 1R releases and opens at its armature 2 the locking path for relay 1S and relay 1S releases. Relay 1R also opens the operating path through its armature 2 for the gate control relay 8GC1, which, however, remains operated if a relay 1S in one of the trunk circuits 1TR01–35 is operated at this time. If no other relay 1S is operated, relays 8GC1 and 8GT successively release, as described above, reopening the gate for admitting calls waiting to be served.

When relay 1R in the circuit 1TR00 releases, it also opens the operating path for relay 1T and causes relay 1T to release. The operating path for relay 1T is opened at the operated armatures 4 and 5 of relay 1R. When relay 1S releases, it also opens the operating paths for the select magnets 2S0 and 3S0 and for the relay 10TC. The operating path for the select magnets 3S0 and 2S0, as described above, is through the armatures 5 of the relays 1T and 1S and the operating path for the relay 10TC, also as described above, is through the lead 1TC and the operated armature 5 of relay 1S. When the relay 10TC releases, it in turn releases its associated relay 10TC1.

As indicated above when relay 10SR operates, it also in turn operates a relay 10RN. The operating path for the relay 10RN is from ground through the winding 10RN, the operated armature 5 of relay 10SR, the normal armature 2 of relay 10C in the transfer circuit 10TS, the windings in parallel of the differential relay 10T, the leads 1A0 and 1B0 in parallel of the cable 1L3 through the now normal armatures 4 and 5 of the relay 1R, leads 1A1 and 1B1 to the next trunk circuit 1TR01 and then therethrough in a chain and successively through the trunk circuits 1TR02–35 and resistor 5R1 to the negative battery 5B1. If any one of the relays 1R in the circuits 1TR01–35 is operated, the connection through the operated armatures 4 and 5 thereof and the normal armatures 8 and 9 of the relay 1S in the same trunk circuit is shunted to leads 1A1 and 1B1. If some of the relays 1S in the circuits 1TR01–35 are operated, the lowest designated one extends the connection from the armatures 4 and 5 of its associated relay 1R through its armatures 8 and 9 to the lower winding of its associated relay 1T. The lower winding of relay 1T is connected to battery 1B3. When relay 10RN operates, it opens the operating path for relay 10SR causing it to release. The message register 10MS is released when armature 2 of relay 10SR returns to normal and relay 10TR releases when armature 3 of relay 10SR returns to normal. Relay 10SR also deenergizes the lamp 10LA by removing ground at its armature 1. The distributing system is in this manner returned to normal regarding serving the abandoned call on trunk 1TK00.

The distributor system can also be manually returned to normal by operating the key 10TRA which connects ground to the winding of relay 10SR.

When relay 10SR returns to normal in the trunk release circuit 10TRC, it also completes an operating path for the relay 1T associated with an operated relay 1S in the lowest designated operated trunk circuit. If, for example, the relay 1S in the trunk circuit 1TR01 is operated when the trunk circuit 1TR00 is returned to normal, the relay 1T in the circuit 1TR01 is operated. The operating path for the relay 1T in the circuit 1TR01 is from battery 1B3 in the circuit 1TR01, the lower winding of relay 1T, the operated armatures 8 and 9 in parallel of relay 1S in the circuit 1TR01, the operated armatures 4 and 5 in parallel of relay 1R in the circuit 1TR01, terminals or leads 1A0 and 1B0 to leads 1A1 and 1B1 of circuit 1TR00, the normal armatures 4 and 5 of relay 1R in the circuit 1TR00, leads 1A0 and 1B0 through cable 1L3, the windings of relay 10T in parallel, the normal armature 2 of the relay 10C, the normal armature 5 of relay 10SR, the normal armature 1 of relay 10L and the normal armature 1 of the relay 10R1 to ground. When relay 1T in the circuit 1TR01 is operated, a sequence similar to that described above in reference to circuit 1TR00 is initiated for connecting the trunk 1TK01 to one of the order positions.

If the call on trunk 1TK00 is not abandoned, relay 10SR does not operate because relay 10TD is operated, as described above, over a path through the operated armature 9 of relay 10TC1. When relay 10TD operates, it opens the operating path for the relay 10SR in the trunk release circuit 10TRC so that relay 10SR does not operate to initiate the release sequence for an abandoned call. At the same time that relay 10TD operates, a polarized relay 10SC in the control circuit 10CON is operated by the relay 10TC1 to check the operation of the select magnets and of the relay 1R in the trunk circuit 1TR00.

The operating path for relay 10SC is from battery 10B11 through the two windings of relay 10SC, the normal armature 2 of relay 10L, the normal armature 3 of relay 10C, lead 10SCL which is part of cable 10L2, the operated armature 2 of relay 10TC1, lead 7SC, the operated armature of the select magnet 6S8, the operated armature of the select magnet 2S0, lead 1D00, resistor 1R1, the operated armature 1 of relay 1R in the circuit 1TR00, the operated armature 4 of relay 1S, lead 1P00 which is part of cable 1L2 and armature 00 of relay 10TR to ground. In this manner the polarized relay 10SC operates when relay 10TD operates to open the operating path for the relay 10SR and prevent the release of the distributor 101 relative to the call on trunk 1TK00.

When the relay 10SC operates, it completes an operating path for two of the hold magnets which correspond to one vertical of the combined switch. The hold magnets of the combined switch are operated on a preference basis determined by the position circuits 8P00–08 and 8P10–18. Each of the position circuits 8P00–18 includes a relay 8PA mentioned above which is operated when the position is idle and ready to serve incoming calls. There are two conditions which must be met in the position circuits 8P00–08 and 8P10–18 for the relay 8PA to be operated: first, the operator must be plugged into the jacks 8A–8D and second, the position must not be busy handling a call.

If more than one of the position circuits 8P00–08 and 8P10–18 is idle and ready to serve a call, the lowest designated one is preferred as the relays 8PA in the eighteen position circuits 8P00–08 and 8P10–18 are connected in a preference chain. Assuming that the position circuit 8P00 is idle and ready to serve a call, an operating path is provided from ground through the normal contacts of a key 8AA, the operated armature of the jack 8B, normal contacts of a relay 8W, the normal armature 00 of a position gate relay 8GP and the winding of relay 8PA to the battery 8B3. When the relay 8PA operates, it locks to ground through its operated armature 6, the normal contacts of relay 8W, the operated armature of jack 8B and the normal contacts of the key 8AA to ground. The gate relay 8GP functions to gate the position circuits 8P00–08 and 8P10–18 in a manner similar to that of the gate relay 8GT which gates the trunks 1TK00–35. When any one of the relays 8PA in the circuits 8P00–08 and 8P10–18 is operated, a ground connection is provided through its operated armature 7 and the operated armature 2 of the relay 8GC1 to the winding of the gate relay 8GP which is also connected to the battery 8B2. When the gate relay 8GP is operated, it opens at its armatures 00–18 the operating paths for the relays 8PA. Any one of the position circuits 8P00–08 and 8P10–18 which becomes available for serving a call thereafter must await the release of the relay 8GP before its relay 8PA can operate. The relay 8GP remains operated as long as any one of the relays 8PA already included in the gate is operated.

When any one of the relays 8PA in the position circuits 8P00–08 and 8P10–18 operate, an indication thereof is provided to the traffic indicator meter 8MT. The meter 8MT, as described above, functions together with its grounded connections as a current source supplying current through paths to batteries 1B4 associated with operated ones of the relays 1R in the trunk circuits 1TR00–35. When a relay 1R operates, a predetermined increase of current through the meter 8MT occurs and when a relay 8PA operates to indicate an idle available position circuit, a similar predetermined increase of current through the meter 8MT occurs.

When both relay 8PA and the relay 8W in the circuit 8P00 are normal, indicating that an operator is not plugged into the jacks 8A–8D, a path is provided from ground through resistor 8R8, the normal armature 8 of relay 8PA, the normal armature 5 of relay 8W, lead 8PA1 to lead 1CW and the meter 8MT. The resistor 8R8 functions with the resistors 1R3 as a voltage divider for the meter 8MT. When the operator plugs into the jacks 8A–8D and relay 8PA operates to indicate that the position is idle and available for handling a call, the connection through the resistor 8R8 is opened causing lead 1CW to become more negative and increase the current through the meter 8MT.

As is hereinafter described, when the position circuit 8P00 becomes busy handling a call, relay 8W is operated and relay 8PA released to provide a connection from the grounded resistor 8R8 through the normal armature 8 of relay 8PA, the operated armature 5 of relay 8W and lead 8PC1 to the meter M. When the ground connection is switched in this manner to the lead 8PC1, the potential provided thereto increases towards ground decreasing the current through the meter 8MT. In this manner, the meter 8MT provides a totalized indication of the excess number of calls awaiting service over the number of idle and available positions. When a position circuit is unavailable or busy a grounded connection is provided to the meter 8MT. The potential provided to the meter 8MT approaches ground potential the larger the excess of idle and available position circuits over calls awaiting service.

Returning now to the connection sequence described above, assuming that the relay 8PA in the position circuit 8P00 is operated when the relay 10SC in the control circuit 10CON operates, a connection is provided for operating the hold magnets 2H0 and 6H0 to complete a talking connection from the trunk 1TK00 to the position circuit 8P00. The operating path for the hold magnets 2H0 and 6H0 is from ground at the operated armature 8 of relay 10TC1, the operated armature of the relay 10TD, the operated armature of the relay 10SC, the normal armature 1 of the relay 10C, the windings of the differential relay 10P in parallel, leads 10PA and 10PB in parallel through cable 10L2, the operated armatures 3 and 4 in parallel of relay 10TC1, leads 9PA and 9PB in parallel through cable 9L3, the operated armatures 4 and 5 of relay 8PA in the position circuit 8P00, lead 8HM of cable 8L4 and the windings of the hold magnets 6H0 and 2H0 in parallel to the batteries 6B0 and 2B0.

Figure 2:
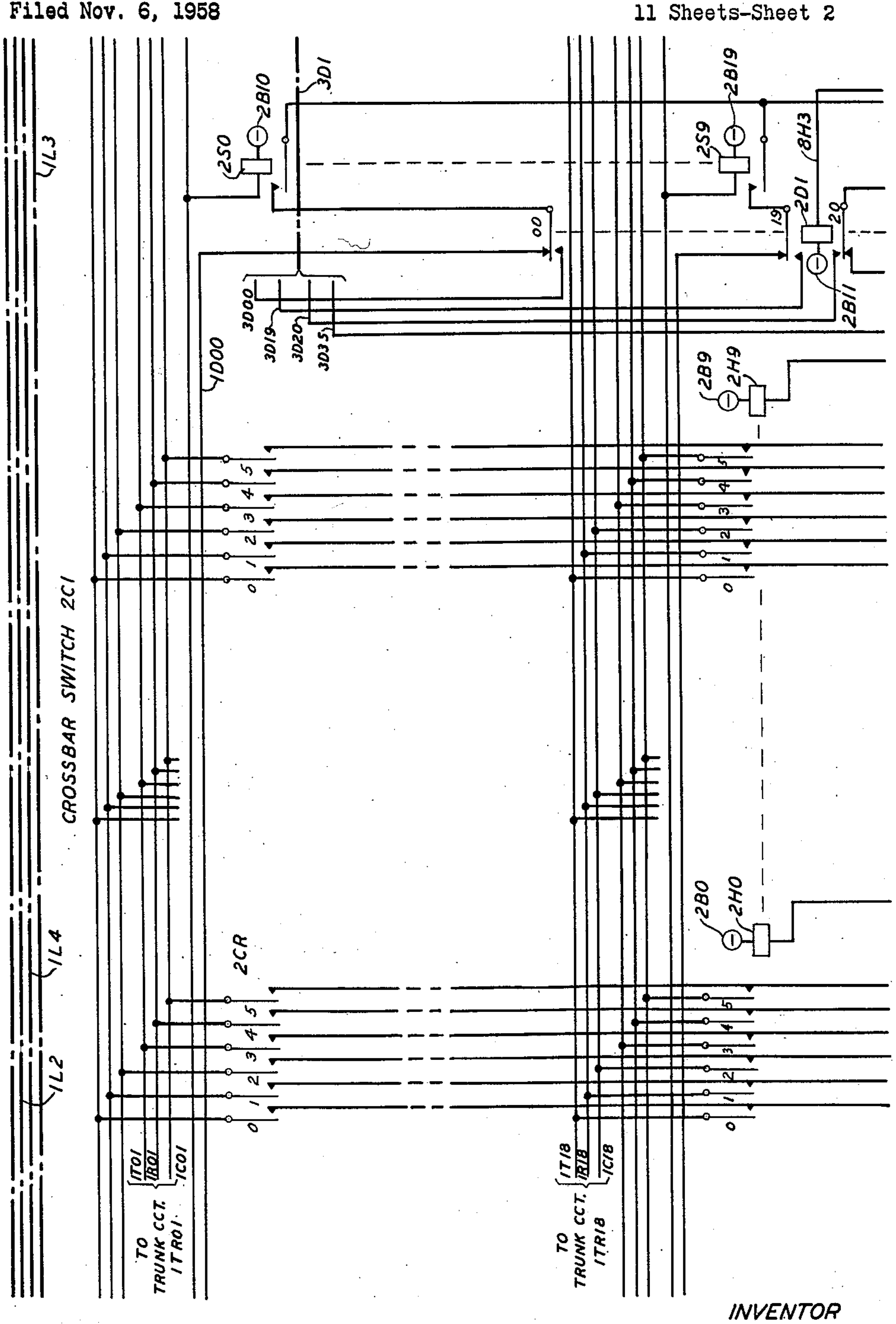
Figs. 2, 3, 6 and 7 illustrate the crossbar switch connecting equipment of the first distributor.
Figure 3:
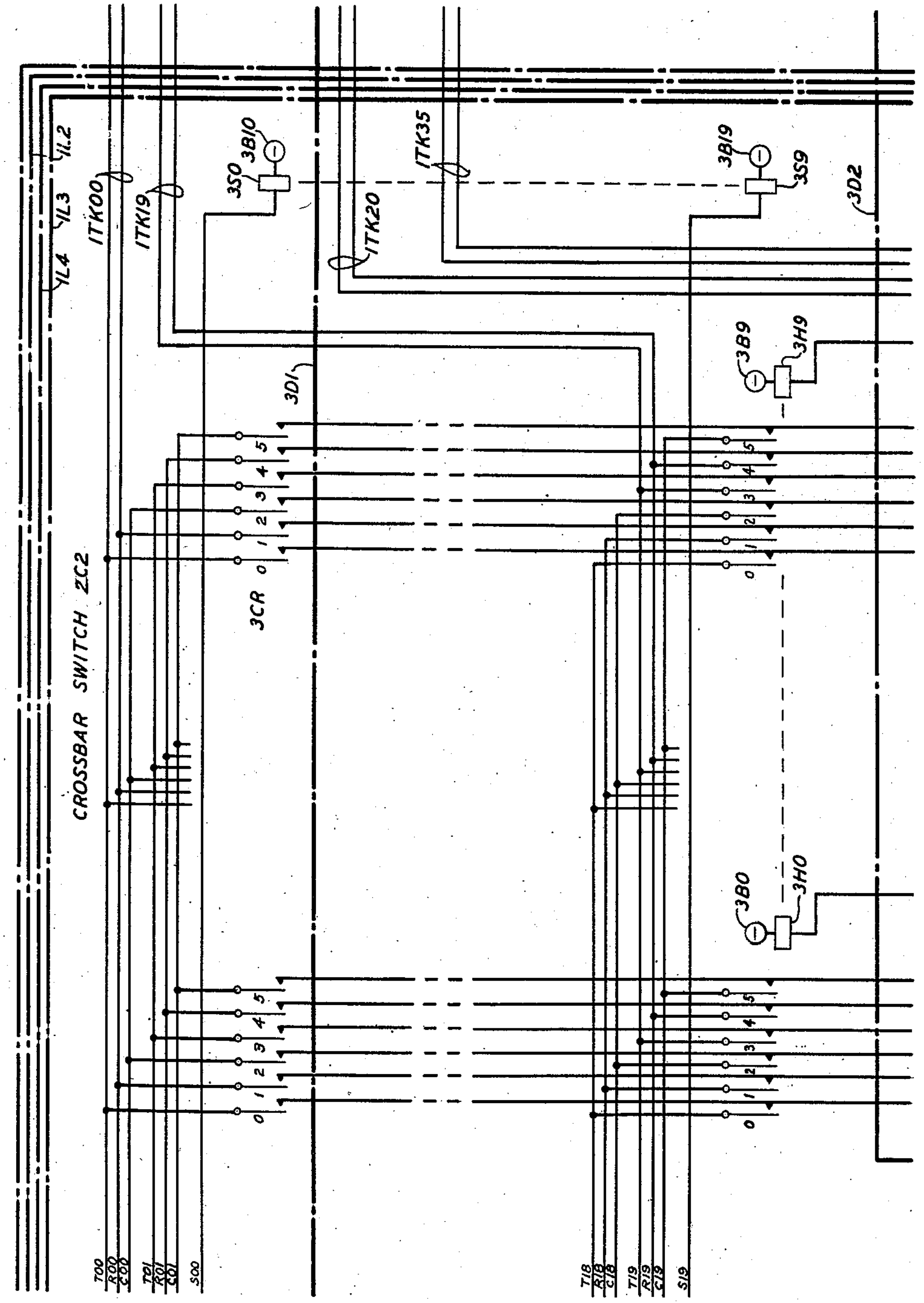

When the hold magnets 2H0 and 6H0 operate, two crosspoints 2CR and 6CR are closed through the combined switch: one, the crosspoint 2CR, in the crossbar switch 2C1; and the other, the crosspoint 6CR, in the crossbar switch 6A1 to establish a path from the trunk 1TK00 to the position circuit 8P00. The tip and ring leads 1T00 and 1R00 of the trunk 1TK00 are connected respectively through the operated armatures 0 and 1 of the crosspoint 2CR which is on the horizontal level controlled by the select magnet 2S0 and on the vertical level controlled by the hold magnet 2H0. As shown in Fig. 2 the armature 0 of the crosspoint 2CR is on the top level to the left of the crossbar switch 2C1. The connection from the tip lead 1T00 is extended from the crosspoint 2CR to the operated armature 0 of the crosspoint 6CR on the next-to-last level associated with the operated select magnet 6S8 of the switch 6A1. As described above, one of the two select magnets 6S8 and 6S9 is operated to select one of the two trunks extended to an operated crosspoint. When the crosspoint 2CR of the switch 2C1 is operated, the two trunks extended thereby to the left vertical are the trunks 1TK00 and 1TK01. With the select magnet 6S8 operated, only the trunk 1TK00 is extended through the crossbar switch 6A1. Continuing therefor with the connection from the tip lead 1T00, a path is provided through the operated armature 0 of the crosspoint 2CR and the operated armature 0 of the crosspoint 6CR, lead 8T of the cable 8L4 to the subset 8SUB of unit B in the position circuit 8P00. Each of the position circuits 8P00–08 and 8P10–18 includes a unit A and a unit B. The unit A includes control circuitry and the unit B includes a subset 8SUB and control jacks 8A–8D control keys 8AA–8FA. The position circuit 8P09 utilized for flashing the PBX operator, as is hereinafter described, includes a unit A but not a unit B. In a similar manner that the tip lead 1T00 is connected through the combined switch, the ring lead 1R00 of the trunk 1TK00 is extended through the operated armature 1 of the crosspoint 2CR, the operated armature 1 of the crosspoint 6CR, lead 8R through cable 8L4 to the subset 8SUB in the position circuit 8P00.

The last two horizontals of the crossbar switches 6A1 and 6A2 can function to select which one of the two trunks should extend to the order position 8P00 because the horizontal common wires on these last two levels have been removed. When a hold magnet of these switches therefore operates, it only provides a connection to one particular position circuit as it extends a connection from only three of the six vertical leads of a switch vertical.

When the crosspoints 2CR and 6CR are closed, ringing is tripped in the central office 100 due to a shunting connection through the operated armature 2 of the relay 8PA which is connected across the leads 8R and 8T.

When the hold magnet 6H0 operates to close the crosspoints 2CR and 6CR in the combined switch it also completes an operating path for a relay 8W in the position circuit 8P00. The operating path for the hold magnet 6H0, which was described above, is extended from lead 8HM through the operated armature of the hold magnet 6H0, lead 8HM1 of the cable 8L4 and the winding of the relay 8W to the battery 8B6. When the relay 8W operates, it locks to ground through its operated armature 2 and the normal contacts of the release key 8AA. When relay 8W operates, it also completes a circuit path for lighting lamp 8LM to summon the operator at the position circuit 8P00. This path is from ground through the 8LM lamp filament, lead L, the operated armature 3 of relay 8W and the resistor 8R3 to battery 8B5.

When relay 8W operates, it also in turn operates a relay 10PC in the control circuit 10CON to initiate the release of the control equipment utilized for setting up the connection from the trunk 1TK00 through the combined switch to the subset 8SUB in the position circuit 8P00. The operating path for the relay 10PC is from ground at the normal armature 3 of relay 10R1, the upper winding of the relay 10PC, lead 9PC, the operated armature 3 of the relay 8PA, the operated armature 1 of the relay 8W and the winding of relay 8PA to battery 8B3.

When relay 8W operates, it also opens the original locking path for the associated relay 8PA through its normal armature 1 but the slow-to-release relay 8PA remains operated over the path to ground through the operated armature 1 of relay 8W and the winding of the relay 10PC.

When relay 8W operates, it also completes a locking path through its armature 4 and the armature 1 of relay 8PA for the relay 1T in the trunk circuit 1TR00 so that relay 1T does not release at this time.

When relay 10PC operates, it shunts the lower high resistance winding of the relay 10SC to release the relay 1R in the trunk circuit 1TR00. The shunting path is from the winding of relay 1R through lead 1D00, the normal armature of relay 2D1, the operated armature of the select magnet 2S0, the operated armature of the select magnet 6S8, lead 7SC, the operated armature 2 of relay 10TC1, lead 10SCL of the cable 10L2, the normal armature 3 of relay 10C, the normal armature 2 of the relay 10L, the upper winding of the relay 10SC and the operated armature of relay 10PC to the battery 10B17. Before relay 10PC operated, the shunting path included the lower winding of the relay 10SC as well as its upper winding. The lower winding, which is a high resistance winding, introduced sufficient impedance in the shunting path to permit the relay 1R to remain operated. When, however, relay 10PC operates, it shunts this high resistance winding of relay 10SC causing the relay 1R to release. When relay 1R releases, it opens the locking path through its armature 2 for its associated relay 1S. Relay 1S, however, remains operated over the locking path for relay 1T described above. This path is from the upper winding of relay 1S through lead 1C00, the operated crosspoints 2CR and 6CR, lead 8CC of cable 8L4, the operated armature 1 of relay 8PA in the circuit 8P00, and the operated armature 4 of relay 8W to ground. As is hereinafter described, relay 1S remains operated when relay 8PA releases due to the shunting connection of the resistor 8R2 across the armature 2 of relay 8PA.

When the relay 1R in the trunk circuit 1TR00 releases, it also releases the relay 10SC in the control circuit 10CON to initiate a release sequence for returning the distributor 101 to normal relative to the call on the trunk 1TK00 so that another call can be served. The operating path for the relay 10SC, as indicated above, is through the shunting path for relay 1R including the lead 1D00 and resistor 1R1, the operated armature 1 of relay 1R, the operated armature 4 of relay 1S, lead 1P00 which is part of cable 1L2 and the normal armature 00 of relay 10TR to ground. When relay 1R releases, it opens this operating path causing the polarized relay 10SC to release.

When the relay 10SC releases, it closes an operating path for the differential relay 10L from ground at the operated armature 8 of relay 10TC1, the operated armature of relay 10TD, the normal armature of relay 10SC, the normal armature 2 of relay 10R1 and the upper winding of relay 10L to battery 10B18. When the relay 10L operates, it in turn successively operates the relays 10RA and 10R1 which are also part of the control circuit 10CON. The operating path for the relay 10RA is from ground through the serially connected windings of relay 10RA, the operated armature 2 of relay 10L, the normal armature 3 of relay 10C, lead 10SCL which is part of the cable 10L2, the operated armature 2 of relay 10TC1, lead 7SC, the operated armature of the select magnet 6S8, the operated armature of the select magnet 2S0, lead 1D00 and the upper winding of relay 1R to the battery 1B5. Relay 10RA operates but relay 1R does not operate over this operating path because the serially connected windings of the relay 10RA introduce a large impedance sufficient to maintain the relay 1R in its normal or release condition. The shunting path which caused relay 1R to release was opened at the armature 2 of relay 10L and the original locking path for relay 1R was opened at its armature 1 when it released.

When relay 10RA operates, it closes an operating path through its operated armature 1 from ground through the winding of the associated relay 10R1 to battery 10B13 causing the relay 10R1 to operate. When relay 10RA operates, it also connects ground through its operated armature 2 to the upper winding of relay 10PC to maintain it operated when relay 10R1 operates and removes at its armature 3 the ground potential therefrom.

When relay 10R1 operates, it opens the operating path for the select magnets 2S0 and 3S0 causing them to release. The select magnets 6S8 and 7S8, however, remain operated until the relay 1T in the trunk circuit 1TR00 releases. As described above, the operating path for the select magnets 2S0 and 3S0 is through the lead 1S00, the operated armature 5 of relay 1T in the trunk circuit 1TR00, the operated armature 5 of the relay 1S, lead 1TC of cable 1L4, the lower winding of relay 10TC, varistor 10D1, the operated armature 7 of relay 10TC1 and the normal armature 1 of relay 10R1. This operating path is opened at armature 1 of relay 10R1 when relay 10R1 operates. When the select magnets 2S0 and 3S0 release, they in turn open the operating path through the armature of the select magnet 2S0 for the relay 10RA in the control circuit 10CON. As indicated above, the operating path for the relay 10RA was through lead 7SC and the serially connected operated armatures of the select magnets 6S8 and 2S0. The relay 10RA in this manner provides a check of the release of the select magnet 2S0.

When the relay 10RA releases, it in turn releases the polarized relay 10PC in the control circuit 10CON and also the relay 8PA in the position circuit 8P00. When relay 10R1 operated, it opened the original operating path through its armature 3 for the relay 10PC and thereafter when relay 10RA releases, it opens at its armature 2 the subsidiary operating path so that relay 10PC releases. Relay 10PC was held operated over a path through lead 9PC, the operated armature 3 of relay 8PA in the position circuit 8P00, the operated armature 1 of the relay 8W, the operated armature 6 of relay 8PA and the winding of relay 8PA to battery 8B3. When this operating path is opened at armature 2 of the relay 10RA, the position relay 8PA also releases. The original operating path for the relay 8PA, as described above, was through the armature 00 of the gate relay 8GP which remains operated as long as any one of the position relays 8PA in the circuits 8P00–18 are operated.

When the relay 10PC releases, it provides a shunting path from battery 10B7 to the lower winding of the relay 10L causing it to release. When the relay 8PA in the position circuit 8P00 releases, it opens the locking path for the relay 1T in the trunk circuit 1TR00. As described above, the relays 1T are connected in a preference chain so that only one is operated. The locking path, as described above, for the relay 1T was from ground at the operated armature 4 of relay 8W through the operated armature 1 of relay 8PA. When relay 8PA releases, it opens the shunt through its armature 1 across the resistor 8R2 introducing an impedance thereby into the locking path of the relay 1T causing it to release. The resistor 8R2 is connected to the lower winding of the relay 1T through the lead 8CC of cable 8L4, the operated armatures 2 of the crosspoints 6CR and 2CR, lead 1C00 and the varistor 1V2.

The relay 1S in the trunk circuit 1TR00 is adjusted to remain operated when relay 8PA removes the shunt across its armature 1 to cause relay 1T to release. When the relay 1T releases, it in turn releases the select magnets 6S8 and 7S8 which were operated, as described above, over a path through lead 1SL and the operated armature 4 of relay 1T. When the relay 1T releases, it also releases the relay 10TD which operated to indicate that the call was not abandoned and it also releases the relay 10TC in the discriminator 10DIS. The operating path for the relay 10TD, as described above, was through lead 1TD and the operated armature 1 of relay 1T, and the operating path for the relay 10TC was through the operated armature 5 of relay 1T. When relay 10TC releases, it in turn releases its associated relay 10TC1 which thereafter opens the operating path for the relay 10R1 in the control circuit 10CON. As described above, the relay 10R1 was locked operated through its operated armature 2, the normal armature of relay 10SC, the operated armature of relay 10TD and the operated armature 8 of relay 10TC1.

In this manner the distributor 101 is normalized with only relay 8W in the position circuit 8P00 remaining operated and the relay 1S in the trunk circuit 1TR00 being operated in addition to the hold magnets 2H0 and 6H0 which maintain the operation of the crosspoints 2CR and 6CR of the combined switch. In addition to these relays and the hold magnets, the gate relays 8GP and 8GT and some of the idle position relays 8PA may be operated. If the distributor 101 is completely normal with no connection set up through the combined switch and no calls awaiting service or ringing tone applied on any of the trunks 1TK00–35, the gate relays 8GP and 8GT are not operated. As soon as ringing tone is applied to any one of the trunks 1TK00–35 the associated relay 1R is operated to initiate the connection sequence, described above, and also to close the trunk gate and possibly the position gate as well. The trunk gate is closed, as described above, when relay 1R successively operates the relays 8GC1 and 8GT. When relay 8GT operates, it opens the operating paths for the other 35 relays 1R which are not operated at the time ringing tone is first applied. When relay 8GC1 operates, it also readies a path through its operated armature 2 for the position gate relay 8GP which then operates when any one of the relays 8PA in the position circuits 8P00–18 is operated. As described above, when the distributor 101 is normal, the relays 8PA are operated to indicate that an operator is plugged into the associated jacks 8A–8D if relay 8GP is normal.

If a number of circuits 8P00–08 and 8P10–18 are idle when the first call comes in, their relays 8PA operate simultaneously through normal armatures of relay 8GP. The operated relays 8PA thereupon complete the operating path through their armatures 7 for the relay 8GP.

When the gate relay 8GP operates, the position circuits 8P00–08 and 8P10–18 which have operated relays 8PA at this time successively handle calls with the lowest designated one being first preferred. When the last of these relays 8PA is released and further calls are awaiting service as indicated by the operation of the relay 8GC1, the relay 8GP releases allowing the idle ones of the position circuits 8P00–08 and 8P10–18 to be admitted into the gate which occurs by permitting their relays 8PA to operate. When none of the relays 1R are operated to indicate that no further calls are awaiting service, the relay 8GC1 releases to release the relay 8GT and to open the operating path for the relay 8GP. The relay 8GT releases to open the gate for admitting subsequent calls but the relay 8GP remains locked operated through its operated armature 19 until all of the position circuits admitted to the gate have connections completed thereto. The position circuits admitted to the gate at this time are those that have operated relays 8PA. The locking armature 19 of the relay 8GP, in this manner, prevents opening the position gate until the last connection has been completely established as indicated by the release of the position relay 8PA associated therewith. The position gate in this manner is operated as long as any one of the relays 8PA is operated, and the trunk gate relay 8GT remains operated as long as there are operated relays 1R associated with operated relays 1S. The reason for operating the position gate relay 8GP through an armature of the relay 8GC1 is to prevent giving preferential treatment to the last two position circuits 8P17–18 in the chain. Suppose that the relay 8GP is not operated through an operated armature of relay 8GC1, that no calls are awaiting service, and that all the circuits 8P00–08 and 8P10–18 are idle and available. Also assume that all eighteen relays 8PA are operated. As calls come and the circuits 8P00–08 and 8P10–18 are successively busied, their relays 8PA are released. The released relays 8PA do not reoperate because relay 8GP is operated. When the last relay 8PA in the chain releases, which is relay 8PA in the circuit 8P18, relay 8GP releases opening the gate and permitting relays 8PA in the circuits 8P00–08 and 8P10–17 to operate. When these relays 8PA operate, relay 8GP now reoperates independent of whether calls are awaiting service or not. Only the relay 8PA in the circuit 8P18 is outside the position gate. During the time the relays 8PA in the circuits 8P00–08 and 8P10–17 are successively released as connections are set up, the relay 8PA in the circuit 8P18 remains normal. When the relay 8PA in the circuit 8P17 releases, to release relay 8GP and reopen the gate, the relays 8PA in the circuits 8P00–08, 8P10–16 and 8P18 operate. The operator at the circuit 8P18 thereafter awaits the operation of the preference chain for the second time before serving a call. The relay 8PA in the circuit 8P17 remains released until after relay 8PA in the circuit 8P18 releases. In this manner, if the trunk gate does not control the position gate, the last two position circuits 8P17–18 receive preferential treatment and serve approximately half the calls that the other position circuits serve.

Controlling the position gate by the trunk gate as well as by the availability of positions, provides a more equitable basis of serving calls as all positions are normal until the first call is received. If no calls are waiting to be served when relay 8PA in the circuit 8P18 releases, the gate relay 8GP does not operate and none of the relays 8PA operate. Thereafter when a call comes into the distributor 101, all idle position circuits 8P00–08 and 8P10–18 are entered to the gate as all their relays 8PA operate. In this manner the circuits 8P17 and 8P18 are utilized as often as the others.

After the call, which was established as described above, has been served at the position circuit 8P00, the circuit 8P00 is returned to normal and the connection through the combined switch from the trunk 1TK00 is released by operating the release key 8AA in unit B of the circuit 8P00. When the key 8AA is operated, it opens the locking path through the operated armature 2 of relay 8W causing relay 8W and the hold magnets 6H0 and 2H0 to release. When the hold magnets 6H0 and 2H0 release, the crosspoints 6CR and 2CR open disconnecting the trunk 1TK00 from the position circuit 8P00. When relay 8W releases, it opens at its armature 4 the locking path for relay 1S in the circuit 1TR00. The relay 8PA in the circuit 8P00 remains normal if the gate relay 8GP is operated at this time. When relay 8W releases, it opens the circuit path which extends from ground through the 8LM lamp filament, lead L, the armature 3 of relay 8W and the resistor 8R3 to battery 8B5, and causes lamp 8LM to extinguish.

When the operator at the circuit 8P00 releases from the jacks 8A—8D, the position circuit 8P00 remains seized unless the release key 8AA is operated to open the ground connection, described above, to the winding of relay 8W.

During the time that the connection is established to the position circuit 8P00, the operator at the circuit 8P00 can initiate a transfer sequence of operation for establishing another connection from the trunk 1TK00 to a number of different destinations. The position circuit 8P00 includes a set of keys 8AA–8FA, which were mentioned above, for initiating transfer sequences and for readying the circuit 8P00 for handling another call. As described above, the key 8AA is operated to release the relay 8W making the position circuit 8P00 idle in readiness for another call. The rest of the keys 8BA–8FA initiate transfer sequences of operation. The transfers are flexible in that each of the circuits 8P00–08 and 8P10–18 may have a different set of transfer destinations. It is generally advisable, however, to provide for a transfer from each of the circuits 8P00–08 and 8P10–18 to a supervisory position circuit 10SP. In the position circuit 8P00 the key 8FA is operated to establish a connection through the combined switch from the trunk 1TK00 to the supervisory position circuit 10SP which parallels the connection from the trunk 1TK00 to the position circuit 8P00.

When the key 8FA is operated closing its three armatures 1–3, an operating path is completed for a relay 10A in the transfer circuit 10TS. The operating path for the relay 10A is from ground through the serially connected windings of relay 10A, the normal armature 1 of a marginal relay 10B, lead 8T and cable 8C4, the operated armature 2 of the key 8FA in the circuit 8P00, the operated armature 3 of relay 8W and the resistor 8R3 to battery 8B5. When the relay 10A operates, it completes an operating path for an associated relay 10C from ground through the operated armature of relay 10A, the winding of relay 10C and the resistor 10R7 to the battery 10B14. The relay 10C operates unless a connection sequence of operation is taking place. If relay 10TC1 in the discriminator 10DIS is operated at the time that the transfer sequence of operations is initiated by the operator at the position circuit 8P00, a shunting ground is provided through the operated armature 1 of relay 10TC1, lead 10TR3 of cable 10L2 and the normal armature 5 of relay 10C to the winding of relay 10C. This ground connection inhibits the operation of the relay 10C when relay 10A operates. In this manner the transfer sequence awaits the completion of the normal connection sequence of operations if one is taking place.

When the relay 10TC1 releases during the normal connection sequence, relay 10C operates to complete the remainder of the transfer sequence. The transfer sequence therefore has preference over succeeding calls awaiting service on the trunks 1TK01–35.

Assuming that a connection sequence is not in progress, relay 10C operates to close an operating path through its operated armature 7 for the marginal relay 10B which, however, does not operate unless two transfer sequences are simultaneously initiated. If operators at two of the position circuits 8P00–08 and 8P10–18 simultaneously initiate a transfer sequence, two parallel paths are connected to the upper winding of the marginal relay 10B causing it to operate. If only a single transfer is initiated the relay 10B does not operate. One of the paths for the relay 10B is from ground through its normal armature 3, its upper winding, the operated armature 7 of relay 10C, lead 8R of cable 8C4, the operated armature 3 of the key 8FA, lead 8CC of cable 8L4, the operated armatures 2 of the crosspoints 6CR and 2CR, lead 1C00, varistor 1V2 and the lower winding of the relay 1T to battery 1B3. If a winding of only one relay 1T is connected to the winding of the marginal relay 10B, relay 10B does not operate. Relay 1T operates, however, to continue the transfer sequence of operations. If relay 10B operates indicating simultaneous transfer sequences, it opens the operating path at its armature 1 for relay 10A causing it to release and in turn release the relay 10C. In addition when the armature 3 of relay 10B is operated, the shunt across the lower winding of relay 10B is removed introducing an additional impedance in the operating circuit for the relays 1T connected thereto to prevent their operation.

When relay 10C operated, it shunted the lower winding of the relay 10A at its armature 6 providing a shunting path through lead 8T and the operated armature 2 of the key 8FA for the lamp 8LM causing it to extinguish. Thereafter when relay 10C releases because of two or more simultaneously initiated transfers, it removes the shunt connection through its operated armature 6 to permit the lamp 8LM to re-energize. With the lamp 8LM energized, the operator at the circuit 8P00 has an indication that a simultaneous transfer sequence was initiated. When relay 10B operates, it locks through its operated armature 2, lead 8R of cable 8C4 through the operating path, described above, for relay 1T and it releases relay 10A. The relay 10B remains operated until the key 8FA is released. When the key 8FA is released, relay 10B releases returning the transfer circuit 10TS to normal.

If only a single transfer is initiated, relay 10B does not operate and relay 10C in the transfer circuit 10TS remains operated and relay 1T in the trunk circuit 1TR00 operates. With relay 10C remaining operated, it initiates a sequence similar to that described above for establishing the connection to the position circuit 8P00 except now the connection is to the supervisor circuit 10SP.

Briefly, when relay 10C operates in addition to operating the relay 1T, it also extends a connection from batteries 3B9, and 7B9, respectively, through the windings of the hold magnets 7H9 and 3H9, lead 8H5, the operated armature 1 of the key 8FA, lead 8H of cable 8C4 and the operated armature 1 of the relay 10C to a contact of the relay 10SC in the control circuit 10CON. In readying this path through the armature 1 of relay 10C, connections through the leads 10PA and 10PB are opened thereat to prevent the selection of one of the position circuits 8P00–08 and 8P10–18 which occurs during the normal connection sequence. As is hereinafter described, the path through the operated armature 1 of relay 10C is completed to operate the hold magnets 3H9 and 7H9 when the polarized relay 10SC is operated. The relay 10SC is operated and a relay 10SCA is operated as well over a series operating path when relay 10C operates. The series operating path is from ground through the winding of the relay 10SCA, the normal armature of the relay 10SCA, the operated armature 4 of relay 10C, the normal armature 2 of the relay 10L and the serially connected windings of the relay 10SC to battery 10B11. When the relay 10SCA operates, it locks through its operated armature, the operated armature 5 of relay 10C and resistor 10R7 to battery 10B14. Relay 10SC, however, remains operated, even though its operating path is opened, being a polarized relay which remains in either condition unless positively changed. When relay 10SC operates, it extends the path described above from the windings of the hold magnets 3H9 and 7H9 through its operated armature to the armature of the relay 10TD in the trunk release circuit 10TRC.

As is hereinafter described, the relay 10TD is operated after the successive operation of the relays 10TC and 10TC1 by the relay 1T in the trunk circuit 1TR00 to complete the operating path for the hold magnets 3H9 and 7H9. As described above, relay 1T is operated by relay 10C. When relay 1T operates, it completes a path from ground through the windings of relay 10TC, lead 1TC of cable 1L4, the operated armature 5 of relay 1S, the operated armature 5 of relay 1T, lead 1S00 to the windings of the select magnets 2S0 and 3S0. The select magnets 2S0 and 3S0 are not operated due to the impedance of both windingns of relay 10TC in their operating circuit. Relay 10TC, however, operates to in turn operate the relay 10TC1. As is hereinafter described, when relay 10TC1 operates, it causes the operation of the select magnets 2S0 and 3S0. The select magnets 6S8 and 7S8 are operated when relay 1T operates. Relay 1T completes the operating path of the select magnets 6S8 and 7S8 from ground through armature 00 of relay 10TR, lead 1P00 of cable 1L2, the operated armature 4 of relay 1S in the circuit 1TR00, the now operated armature 4 of relay 1T and lead 1SL to the windings of the magnets 6S8 and 7S8.

As mentioned above, when relay 10TC1 operates, it shunts the upper winding of relay 10TC through its operated armature 7 and the normal armature 1 of relay 10R1 to permit the select magnets 2S0 and 3S0 to operate. In addition, realy 10TC1 completes an operating path from ground through the operated armature 8 of relay 10C and the operated armature 9 of relay 10TC1 to the winding of relay 10TD.

When relay 10TD operates, it completes the path from the hold magnets 7H9 and 3H9 to ground at the operated armature 8 of relay 10TC1. When the hold magnets 3H9 and 7H9 operate, a path is completed from the trunk 1TK00 to the supervisory circuit 10SP without disturbing the path from the trunk 1TK00 to the position circuit 8P00. The tip lead 1T00 of the trunk 1TK00 is connected through the operated armatures 0 of the crosspoints 3CR and 7CR, lead 10T of cable 7C3 to the supervisory circuit 10SP. In a similar manner the ring 1R00 of the trunk 1TK00 is extended through the operated armatures 1 of the crosspoints 3CR and 7CR to lead 10R of cable 7C3 which is connected to the supervisory circuit 10SP. When the hold magnet 7H9 operates, it extends its operating path through lead 8H5 to a lead 10HM1 which is also part of cable 7C3. In the supervisory circuit 10SP the lead 10HM1 is connected through the normal armature 3 of a relay 10T to the lower winding of the relay 10R which is also connected to the battery 10B9. Relay 10R operates to connect the ringing current source 10RG through its operated armature 2 and the normal armature 2 of relay 10T to the supervisor's station set 10SET. Relay 10R also locks operated through the normal armature 3 of relay 10T and its operated armature 3 to ground. In this manner, responsive to the operation of the key 8FA, a talking connection is extended from the trunk 1TK00 to the supervisory circuit 10SP and ringing current is applied to the station set 10SET in the circuit 10SP.

When the supervisor responds or plugs in, ground is provided on lead A to operate the relay 10T over a path through the upper winding of relay 10T to battery 10B8. The ground connection on lead A also provides an auxiliary locking circuit for relay 10R through the upper winding of relay 10R. When relay 10T operates, it opens the locking path through its armature 3 for relay 10R and it closes connection at its armatures 1 and 2 from leads 10R and 10T which, as described above, are connected from the trunk 1TK00 through the combined switch to the tip and ring leads of the station set 10SET.

When the key 8FA is released, the operating path for the relay 10A is opened causing it to release and in turn release the associated relay 10C. When the relay 10C releases, it in turn normalizes the relay 10SC by connecting battery 1B5 in the trunk circuit 1TR00 through lead 1D00, the operated armatures of the select magnets 2S0 and 6S8, lead 7SC, the operated armature 2 of relay 10TC1, lead 10SCL of cable 10L2, the normal armature 3 of relay 10C, the normal armature 2 of relay 10L and the serially connected windings of the relay 10SC to battery 10B11. When the relay 10SC is returned to normal, it initiates the sequence, described above, for returning the distributor 101 to normal relative to the call on trunk 1TK00 except for the talking connections through the combined switch. More specifically, when relay 10SC releases, it in turn operates the differential relay 10L by extending ground from the operated armature 8 of relay 10TC1 through the operated armature of relay 10TD, the normal armature of relay 10SC and the normal armature of relay 10R1 to the windings of relay 10L.

When relay 10L operates, it in turn operates the associated relay 10RA by closing the connection, described above, to battery 1B5 in the circuit 1TR00 through the operated armature 3 of relay 10L to the serially connected windings of relay 10RA. When relay 10RA operates, it in turn operates the associated relay 10R1 by extending ground through its operated armature 1. When relay 10R1 operates, it opens at its armature 1 the operating path through lead 1TC for the select magnets 2S0 and 3S0 causing them to release, and at its armature 2 the operating path for relay 10L causing it to release. When the select magnet 2S0 releases, it opens the operating path for the relay 10RA causing it to release.

As mentioned above, when relay 10A releases, it in turn releases relay 10C. When relay 10C releases, it in turn opens the operating path for the relay 1T in the trunk circuit 1TR00 which thereafter releases the select magnet 6S8, the relay 10TD and the relay 10TC. When relay 10TC releases, it in turn releases relay 10R1 which is locked operated through armature 2 of relay 10R1 to ground at armature 8 of lead 10TC1.

The connection remains established to the supervisory circuit 10SP until the ground is removed from lead A of the station set 10SET by the supervisor. With ground removed, relays 10T and 10R release and ground is removed from lead 10HM1 allowing the hold magnets 3H9 and 7H9 to release returning the crossbar switches 3CR and 7CR to normal.

As indicated above, in addition to the transfer to the supervisory circuit 10SP, as described above, a number of other transfers may be made from the position circuit 8P00. For example, a transfer may be made to another of the position circuits 8P00–08 and 8P10–18 or to the distributor 401. Each of the position circuits 8P00–08 and 8P10–18 includes, as described above, the six keys 8AA–8FA which are utilized for releasing the circuit and for transferring or establishing additional connections. As described above, the key 8AA in the circuit 8P00 is the release key and the circuit 8FA is the transfer key to the supervisory circuit 10SP. As shown in the drawing, the key 8BA is wired to initiate a transfer to the position circuit 8P10, the key 8CA is wired to initiate a transfer to the position circuit 8P15 which is not shown, the key 8DA is wired to initiate a transfer to the distributor 401, and the key 8E4 is wired to initiate a transfer back to the P.B.X operator at the position 1PBX in the central office 100. In this manner, there are five different types of operations which are provided by the keys 8AA–8FA.

Figure 8:
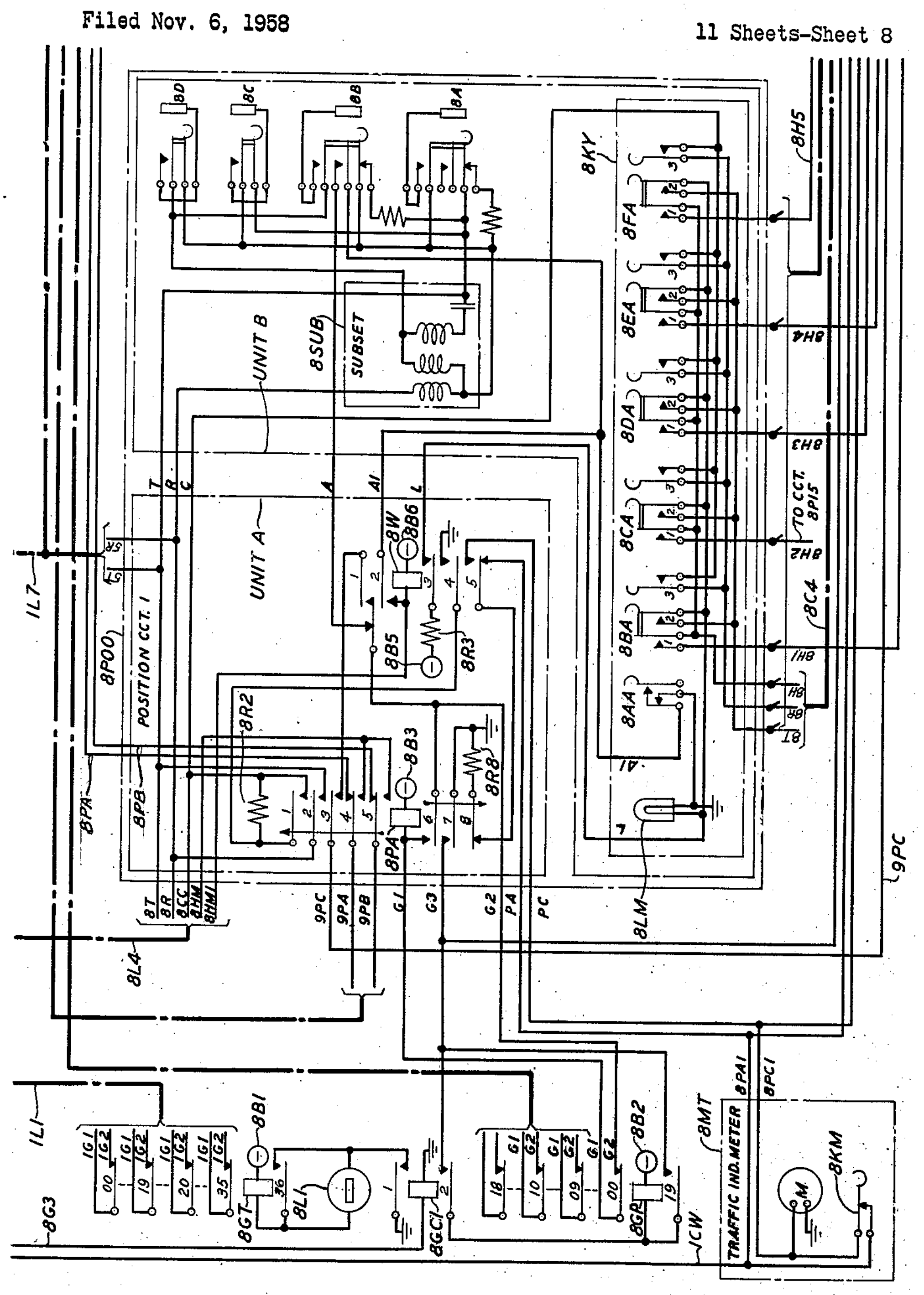
Fig. 8 illustrates some control circuits and an operator position circuit of the first distributor.
Figure 9:
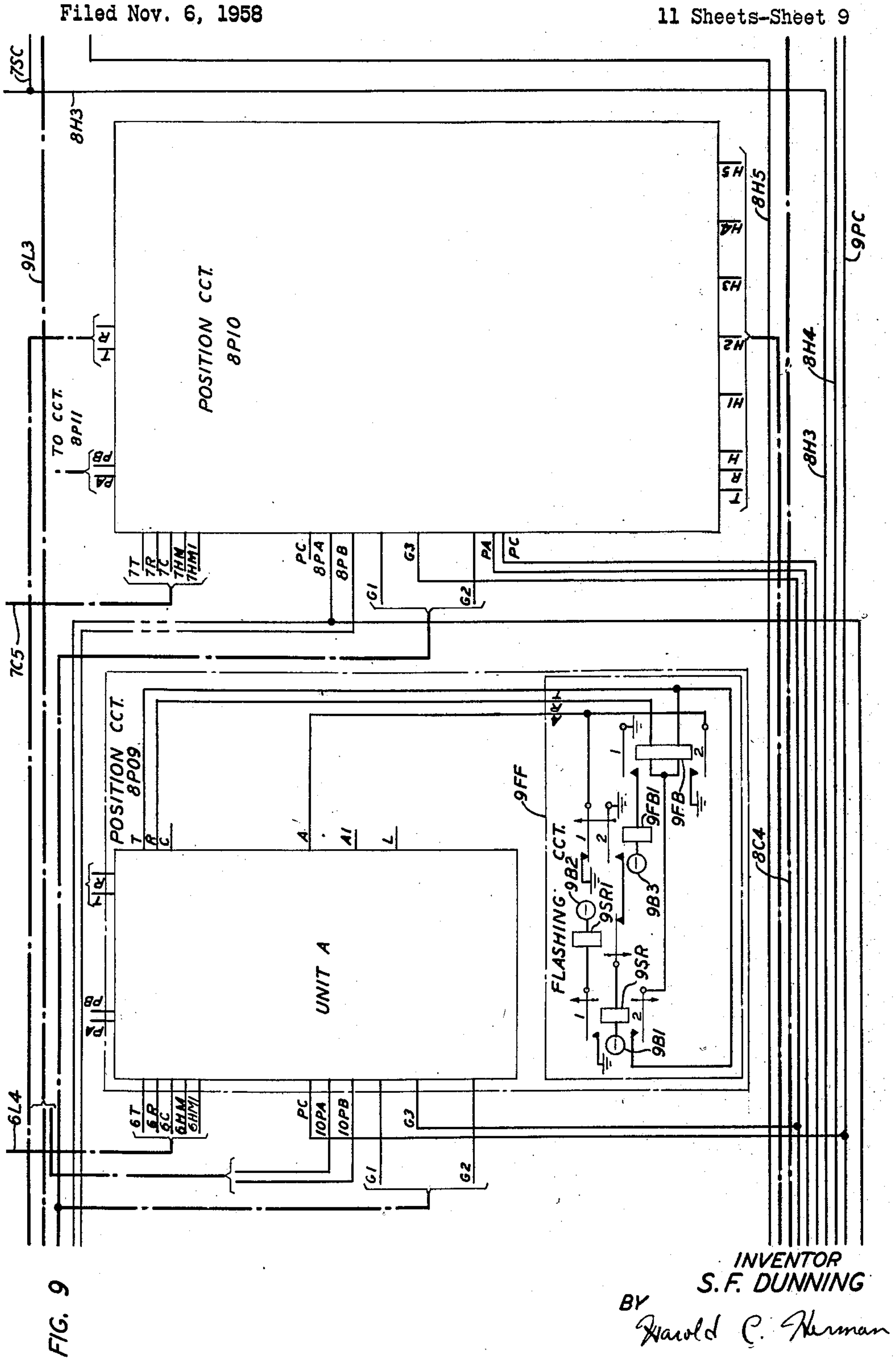
Fig. 9 illustrates functionally additional operator positions and control circuitry.
Figure 10:
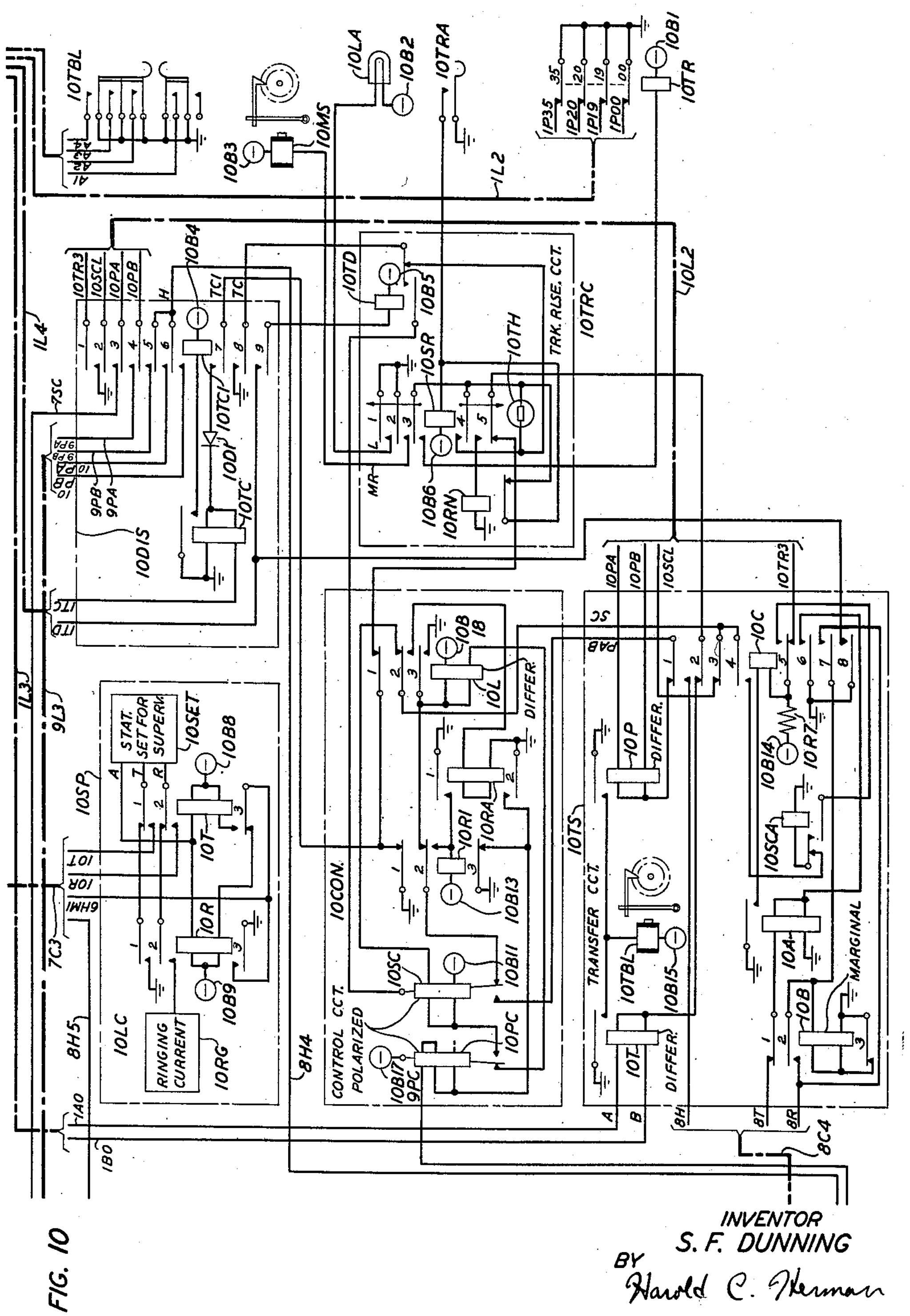
Fig. 10 illustrates the transfer circuit, discriminator circuit and a number of other control circuits of the first distributor.

Assuming that the trunk 1TK00 has been connected to the position circuit 8P00, when the operator thereat closes the key 8BA, a transfer sequence is initiated for establishing an additional connection through the combined switch from the trunk 1TK00 to the position circuit 8P10. This transfer sequence is similar to the transfer sequence described above for establishing a parallel connection to the supervisory circuit 10SP. The only essential difference is that the lead 8H1 from the key 8BA is connected to the lead 8PA of the position circuit 8P10 instead of to the windings of the hold magnets 7H9 and 3H9 as is the lead 8H5 from the key 8FA. As shown in Fig. 8, the lead 9PA is connected through the operated armature 4 of relay 8PA and lead 8HM of cable 8L4 to the windings of the hold magnets 6H0 and 2H0. The relay 8PA, as described above, is operated when the position circuit is idle and available for serving the call. In this manner when the key 8BA is closed, an operating path is closed through the position circuit 8P10 and lead 7HM of cable 7C5 to the windings of the hold magnets 3H0 and 7H0. The rest of the sequence for establishing the transfer connection to the position circuit 8P10 is exactly the same as that described above for transferring a connection to the supervisory circuit 10SP. For the supervisory connection, relay 1S in the trunk circuit 1TR00 is held operated through an operated armature 4 of relay 8W in the position circuit 8P00. When the transfer connection is to another position circuit as to the position circuit 8P10, an additional locking path is provided to the grounded armature 4 of its relay 8W so that trunk 1TK00 remains connected through the combined switch as long as either of the two position circuits 8P00 and 8P10 are not released. Either of the circuits 8P00 and 8P10 may be released without disturbing the parallel connection to the other.

When the key 8CA is closed, the sequence is exactly the same except that the transfer connection is to the position circuit 8P15, not shown, instead of to the position circuit 8P10. When the key 8DA is closed, ground is extended through the lead 8H3 to the winding of the relay 2D1 which is also connected to the battery 2B11 causing relay 2D1 to operate. When the relay 2D1 operates, it readies an operating path through its armature 00, lead 3D00 of cable 3D1 to the upper winding of a relay 4R in the trunk circuit 4TR00 of the distributor 401.

As described above, the distributor 401 has 56 trunk circuits 4TR00–55 which are associated respectively with the 56 trunks 1TK00–55 extending from the central office 100. The trunks 1TK00–35 are multipled to both the distributor 101 and to the distributor 401 but the trunks 1TK36–55 are connected through a cable 3D2 only to the distributor 401. When ringing tone is applied to the trunk 1TK00 it operates the relay 1R in the associated trunk circuit 1TR00 but not the relay 4R in the trunk circuit 4TR00. The lower winding of the relay 4R is not connected across the trunk 1TK00 as is the lower winding of the relay 1R. The relay 4R is operated only when ground is provided to the lead 3D00 in the distributor 101. The lead 3D00 is connected to the upper winding of relay 4R and also to the crossbar switches 4CB which are substantially the same as the crossbar switches 2C1–2C2 and 6A1–6A2 of the combined switch in the distributor 101. The trunk circuits 4TR00–35 are exactly the same as the trunk circuit 1TR00, described above, except for the different connections to the windings of the relay 4R. When relay 4R in the trunk circuit 4TR00 operates responsive to the closing of the key 8DA in the position circuit 8P00, it initiates a connection sequence of operations which is exactly the same as that described above. When relay 4R operates, a connection is established through the crossbar switches 4CB from the trunk 1TK00 to one of the position circuits 4P00–4P18. The trunk circuits 4TR36–55, which are not controlled by the position circuits 8P00–08 and 8P10–18, are exactly the same as the trunk circuits 1TR00 including the connections shown therein to the windings of the relay 1R. In this manner, if required, the operator at the position circuit 8P00 can transfer the call on the trunk 1TK00 to an operator at the distributor 401. A particular one of the position circuits 4P00–18 is not predetermined at the position circuit 8P00 but the next one in the preference chain is selected in the usual manner described above and utilized for the call.

It is apparent that the crossbar switches 4CB have 30 horizontal levels because 56 trunks are connected thereto instead of 20 horizontal levels as in the combined switch of the distributor 101 which has only 36 trunks connected thereto. It is also evident that the combined switch in the distributor 101 and the switches 4CB in the distributor 401 may be expanded or reduced as required for greater or less trunks and position circuits. The smallest economical size of the distributor of this invention would utilize a single 10 by 10 crossbar switch which would serve 16 trunks with ten position circuits.

In addition to the transfer sequences to the supervisory circuit 10SP, to other position circuits in the distributor 101 and to position circuits in the distirbutor 401, the operator at the position circuit 8P00 can signal a P.B.X operator to take charge of the call. As described above, when the call is through the P.B.X position 1PBX, the call is initiated by the application of a battery to the ring lead 1R00 and ground to the tip lead 1T00 instead of by the application of ringing tone thereto. The rest of the sequence of operation for selecting one of the position circuits 8P00–08 and 8P10–18 and for establishing a connection thereto is exactly the same. If the operator at the position circuit 8P00 wishes to return the call to the P.B.X operator, the key 8EA is closed. When the key 8EA is closed, it initiates a transfer sequence for establishing a connection from the trunk 1T00 through the combined switch to the position circuit 8P09. The position circuit 8P09 is not the same as the position circuits 8P00–08 and 8P10–18. As indicated above, the position circuit 8P09 is not included in the preference chain so that it cannot be selected for serving a call. The position circuit 8P09 is only utilized to flash the P.B.X operator at the position 1PBX. The position circuit 8PO9 includes a unit A which is exactly the same as that shown in the position circuit 8P00 but it does not include a unit B having jacks 8A–8D and keys 8AA–8FA. Instead, it includes the flashing circuit 9FF which is connected to the unit A.

When the key 8EA is operated, ground potential is provided through the lead 8H4 to the armatures 5 and 6 of relay 10TC1. When relay 10TC1 operates during the transfer sequence, which is exactly the same as described above, the ground connection is extended through the operated armatures 5 and 6 thereof, leads 10PB and 10PA to the unit A of the position circuit 8P09. In the unit A of the position circuit 8P09, relay 8PA is operated as long as the position circuit 8P09 is not being utilized for another transfer sequence and as long as it has been admitted to the position gate by the relay 8GP. With relay 8PA operated, the ground connection through leads 10PA and 10PB is extended to lead 6HM of the cable 6L4 to the windings of the hold magnets 2H9 and 6H9 causing them to operate. When the hold magnets 6H9 and 2H9 operate, an additional connection is provided from the trunk 1TK00 to the position circuit 8P09. In the position circuit 8P09 the tip and ring leads 6T and 6R are extended to the flashing circuit 9FF. With battery on the ring lead 1R00 and ground on the tip lead 1T00, the relay 9FB in the circuit 9FF is operated. When the relay 9FB operates, it provides an additional locking ground through its operated armature 2 and lead A for relay 8PA in unit A and it completes an operating path at its armature 1 for the associated relay 9FB1. The winding of the relay 9FB1 is connected to a battery 9B3 and to ground through the operated armature 1 of the relay 9FB. When the relay 9FB1 operates, it opens a locking path at its armature 1 for the relay 8PA and it completes an operating path through its armature 2 and an armature of relay 9SR1 to the winding of relay 9SR which is also connected to a battery 9B1. When relay 9SR operates, it in turn operates the relay 9SR1 over a path from ground through its operated armature 1 and the winding of the relay 9SR1 to battery 9B2. When relay 9SR1 operates, it opens the operating path for the relay 9SR causing it to release.

When the relay 9SR operates, it shunts the lower winding of the relay 9FB through its operated armature 2 changing the impedance across the tip and ring leads of the trunk 1TK00. When relay 9SR releases, it also opens the operating path for relay 9SR1 which in turn releases. When relay 9SR1 releases, it recloses the operating path for relay 9SR to reinitiate the flashing cycle which changes the impedance across the tip and ring leads of the trunk 1TK00. At the P.B.X position 1PBX this flashing signal is detected by the operator who thereupon establishes a connection to talk to the calling subscriber.

Any number of flashing position circuits such as the position circuit 8P09 can be provided instead of just one. When more than one flashing circuit is provided, their relays 8PA are connected in a preference chain in a similar manner as that described above for the relays 8PA in the position circuits 8P00–08 and 8P10–18.

A number of simultaneous talking connections may be established to any one of the trunks by successively operating the transfer keys at one or more operator position circuits.

It is to be understood that the above-described arrangements are illustrative of the application of the principles of this invention. Numerous other arrangements may be devised by those skilled in the art without departing from the spirit and scope of the invention. For example, the system may include more than two distributors, and a larger or smaller number of trunks and positions. In fact, the flexibility of the system is an important aspect of the invention. It is evident therefore that other arrangements may be devised without departing from the spirit and scope of the invention.

What is claimed is:

1. In a telephone system, a plurality of trunks, a first set of operator positions, a first crossbar switch for connecting any one of said trunks to any one of said first set of operator positions, a second set of operator positions, a second crossbar switch for connecting any one of said trunks to any one of said second set of operator positions, a first trunk circuit for each of said trunks associated with said first crossbar switch, a second trunk circuit for each of said trunks associated with said second crossbar switch, means responsive to ringing current on any one of said trunks for operating said first trunk circuit associated with said rung trunk, means controlled by said operated first trunk circuit for operating said first crossbar switch to connect said rung trunk to an available one of said first set of operator positions, transfer means at each of said first set of operator positions, means responsive to the operation of said transfer means at said connected position for operating said second trunk circuit associated with said rung trunk, and means controlled by said operated second trunk circuit for operating said second crossbar switch to connect said rung trunk to an available one of said second set of operator positions.

2. In a telephone system, a plurality of trunks, a set of operator positions, a crossbar switch arrangement for connecting any one of said trunks to any one of said operator positions, means responsive to ringing current on any one of said trunks for operating said crossbar switch arrangement to establish a first talking connection from said rung trunk to an idle one of said operator positions, and transfer means at each of said operator positions for operating said crossbar switch arrangement to establish a second talking connection from said rung trunk to any one of a predetermined group of said operator positions.

3. In a telephone system in accordance with claim 2 wherein said transfer means includes means for determining the identity of said rung trunk, means for selecting one of said positions in said predetermined group of positions, and means controlled by said determining means and by said selecting means for establishing said second talking connection from said runk trunk to said selected position without disturbing said first talking connection established through said crossbar switch arrangement from said rung trunk.

4. A distributing system including a first and a second distributor, a central office, a plurality of trunks each extending from said central office to both said first and said second distributor, a plurality of operator positions at each of said distributors, and means responsive to the application of a calling signal to any one of said trunks for operating said first distributor to establish a talking connection from said calling trunk to an idle one of said operator positions at said first distributor, each of said operator positions at said first distributor including transfer initiating means for operating said second distributor to establish a connection from said calling trunk to an idle one of said operator positions at said second distributor without disturbing the connection through said first distributor.

5. A distributing system in accordance with claim 4 including at least one flashback circuit at said first distributor, and wherein each of said operator positions at said first distributor includes transfer initiating means for operating said first distributor to establish a connection from said calling trunk to said flashback circuit, and means for returning said connected to operator position to normal without disturbing the connection from said flashback circuit to said calling trunk.

6. A distributing system in accordance with claim 4 wherein each of said distributors includes a trunk preference gate for controlling the preference of establishing connections from calling ones of said trunks, and a position preference gate controlled by said trunk gate for determining the preference of establishing connections to idle ones of said operator positions.

7. A distributing system in accordance with claim 6 wherein each of said distributors includes a crossbar switch having a plurality of horizontals each connected to two of said trunks, and a plurality of verticals each connected to two of said operator positions, and means including two horizontals of said switch for determining which one of the two trunks connected to any horizontal is to be connected to a selected one of said operator positions.

8. In a telephone system including a plurality of trunks, a plurality of operator positions, switching means for connecting any one of said trunks to any one of said operator positions, a first common preference circuit for establishing a preference for selecting calling ones of said trunks for connection by said switching means, means responsive to the selection of one of said calling trunks for operating said switching means to connect said selected trunk to a selected one of said operator positions, a second common preference circuit for establishing a preference for selecting idle ones of said operator positions including gating means disabled by said first common preference circuit as long as none of said trunks is in a calling condition for determining when said preference is to be established by said second common preference circuit.

9. In a telephone system including a plurality of trunks, a plurality of operator positions, switching means for connecting any one of said trunks to any one of said operator positions, means for periodically determining the order in which idle ones of positions shall have calling trunks extended thereto, and means effective as long as not one of said trunks is in a calling condition for inhibiting the operation of said determining means.

10. In a telephone system, a plurality of trunks, a first set of operator positions, a first crossbar switch for connecting any of said trunks to any one of said first set of operator positions, a second set of operator positions, a second crossbar switch for connecting any one of said trunks to any one of said second set of operator positions, a first trunk circuit for each of said trunks associated with said first crossbar switch, a second trunk circuit for each of said trunks associated with said second crossbar switch, means responsive to ringing current on any one of said trunks for operating said first trunk circuit associated with said runk trunk, means controlled by said operated first trunk circuit for operating said first crossbar switch to connect said runk trunk to an available one of said first set of operator positions, transfer means at each of said first set of operator positions, means responsive to the operation of said transfer means at said connected position for operating said second trunk circuit associated with said runk trunk, means controlled by said operated second trunk circuit for operating said second crossbar switch to connect said runk trunk to an available one of said second set of operator positions, means for periodically determining the order in which available ones of said first set of positions shall have rung ones of said trunks connected thereto, and means effective during the absence of ringing on all of said trunks for inhibiting the operation of said determining means.

11. In a telephone system, a plurality of talking trunks, a set of operator positions, a crossbar switch arrangement for connecting any one of said trunks to any one of said operator positions, means responsive to the initiation of a calling condition on any one of said trunks for operating said crossbar switch arrangement to establish a talking connection from said calling trunk to an idle one of said operator positions, means at said connected to operator position for successively reoperating said crossbar switch arrangement to establish additional talking connections from said calling trunk to others of said operator positions without disconnecting the established connection from said calling trunk to said connected to operator position, and releasing means at each of said operator positions for controlling said crossbar switch arrangement to disconnect one of the connections from said calling trunk without disturbing the others.

12. In a telephone system in accordance with claim 11 comprising in addition an alerting circuit, and means at said operator positions for controlling said crossbar switch arrangement to establish a connection from said calling trunk to said alerting circuit and for releasing the other connections from said calling trunk whereby an alerting signal is returned over said calling trunk without requiring the connection of any one of said operator positions thereto.

No references cited.